United States Patent Office 3,558,595
Patented Jan. 26, 1971

3,558,595
2'-CYCLIC ESTERS AND 5'-CYCLIC ESTERS OF 3'-DEOXY - 3' - DIHYDROXYPHOSPHINYLMETHYL - β - D - RIBOFURANOSYLNUCLEOSIDE DERIVATIVES AND INTERMEDIATES THEREFOR
Gordon H. Jones, Palo Alto, and John G. Moffatt, Los Altos, Calif., assignors to Syntex Corporation, Panama, Panama, a corporation of Panama
No Drawing. Filed Feb. 28, 1969, Ser. No. 803,417
Int. Cl. C07d 51/52, 51/54
U.S. Cl. 260—210                                13 Claims

ABSTRACT OF THE DISCLOSURE

This invention relates to 5'-cyclic esters of 3'-deoxy-3'-dihydroxyphosphinylmethyl - β-D-ribofuranosyl nucleosides and 2'-cyclic esters of 3'-deoxy-3'-dihydroxyphosphinylmethyl-β-D-ribofuranosyl nucleosides which are valuable pharmacological agents. For example, they are useful in regulating and controlling metabolism and for producing metabolic deficiencies in biological systems. This invention also relates to 3-phosphinylmethylfuranose and 3' - deoxy-3'-dihydroxyphosphinylmethyl-β-D-ribofuranosyl nucleoside intermediates for preparing these cyclic esters.

---

This invention relates to 5'-cyclic esters of 3'-deoxy-3'-dihydroxyphosphinylmethyl - β-D-ribofuranosyl nucleosides, 2'-cyclic esters of 3'-deoxy-3'-dihydroxyphosphinylmethyl-β-D-ribofuranosyl nucleosides and intermediates therefor, including 3-phosphinylmethylfuranose and 3'-deoxy - 3'-dihydroxyphosphinylmethyl-β-D-ribofuranosyl nucleosides.

Prior to this invention, the 5'-cyclic esters of 3'-deoxy-3'-dihydroxyphosphinylmethyl-β-D-ribofuranosyl nucleosides and 2'-cyclic esters of 3'-deoxy-3'-dihydroxyphosphinylmethyl-β-D-ribofuranosyl nucleosides of this invention as well as the 3-phosphinylmethylfuranose and 3'-deoxy - 3'-dihydroxyphosphinylmethyl-β-D-ribofuranosyl nucleoside intermediates and methods for preparing them were not known. Procedures known in the art such as those described in U.S. Pat. 3,238,191 do not produce the compounds of this invention.

It is accordingly an object of this invention to provide 5'-cyclic esters of 3'-deoxy-3'-dihydroxyphosphinylmethyl-β-D-ribofuranosyl nucleosides and 2'-cyclic esters of 3'-deoxy - 3'-dihydroxyphosphinylmethyl-β-D-ribofuranosyl nucleosides, and 3-phosphinylmethylfuranose and 3'-deoxy - 3'-dihydroxyphosphinylmethyl-β-D-ribofuranosyl nucleoside intermediates therefor. It is another object of this invention to provide methods for preparing the intermediate compounds and cyclic esters of this invention.

The 5'-cyclic esters of 3'-deoxy-3'-dihydroxyphosphinylmethyl-β-D-ribofuranosyl nucleosides and 2'-cyclic esters of 3'-deoxy-3'-dihydroxyphosphinylmethyl-β-D-ribofuranosyl nucleosides of this invention can be represented by Formulas A and B, respectively:

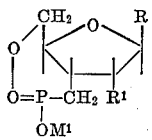

(A)

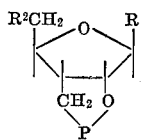

(B)

wherein:

R is a pyrimidine or purine base and the conventional hydrolyzable acyl derivatives thereof;

$R^1$ and $R^2$ each is hydroxy or conventional groups convertible to hydroxy by hydrolysis; and $M^1$ and $M^2$ each is hydrogen or a pharmaceutically acceptable cation.

The 3-phosphinylmethylfuranose intermediates of this invention are represented by Formulas C and D, and the 3' - deoxy-3'-dihydroxyphosphinylmethyl-β-D-ribofuranosyl nucleoside intermediates of this invention are represented by Formula E:

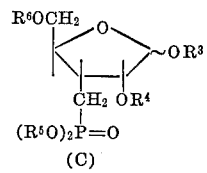

(C)

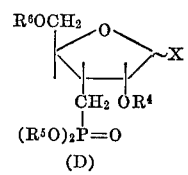

(D)

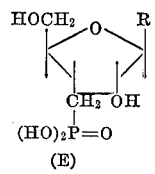

(E)

In the above formulas:

$R^3$ and $R^4$ is a lower aliphatic hydrocarbon acyl group such as formyl, acetyl, propionyl, butyryl, isobutyryl, valeryl, isovaleryl and the like, preferably acetyl;

$R^6$ is a lower aliphatic hydrocarbon acyl group such as described above with respect to $R^3$ such as acetyl, or proferably a benzoyl or an alkyl, nitro or chloro substituted benzoyl group having up to 10 carbons such as o-, m- or p-methylbenzoyl, o-, m- or p-nitrobenzoyl or o-, m- or p-chlorobenzoyl;

$R^5$ is lower alkyl, aryl (including aralkyl and alkaryl) having up to 10 carbons such as phenyl, o-, m- or p-isomers of cumenyl, mesityl, tolyl, the isomers of xylyl; and X is chloro or bromo.

The term "pyrimidine base," as used herein, refers to an unsubstituted or substituted pyrimidine or 6-azapyrimidine group wherein the point of attachment to the ribose unit is through the one position of the pyrimidine group. The term "purine base," as used herein, refers to an unsubstituted or substituted purine, 7-deazapurine or 8-azapurine group wherein the point of attachment to the ribose unit is through the nine position of the purine group. Thus, the term "pyrimidine or purine base" is inclusive of the nitrogen analogs, i.e. members of the 6-azapyrimidine, 7-deazapurine and 8-azapurine series.

A representative but by no means exhaustive listing of pyrimidine and purine bases includes: uracil-1-yl, cytosin-1-yl, 4-chloro-2(1H)-dihydropyrimidon-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, 7-deazaadenin-9-yl, 7-deazaguanin-9-yl, adenin-9-yl, 6-dimethylaminopurin-9-yl, 6-chloropurin-9-yl, 6-mercaptopurin-9-yl, 6-methylmercaptopurin-9-yl, guanin-9-yl, xanthin-9-yl, 2,6-dichloropurin-9-yl, 2,6-dimethylaminopurin-9-yl, 2,6-diaminopurin-9-yl, 8-azaadein-9-yl, thioguanin-9-yl, and 8-azaguanin-9-yl.

The term "pharmaceutically acceptable cations," as used herein, refers to cations of those pharmaceutically acceptable salts conventionally employed in the nucleotide and nucleoside art such as the barium, calcium, sodium, potassium, ammonium, trimethylammonium and triethylammonium salts.

The term "lower alkyl" and derivations thereof appearing in the above definitions and elsewhere in the instant specification denote alkyl groups containing from 1 to 6 carbon atoms, such as methyl, ethyl, propyl, isopropyl, butyl, isobutyl, pentyl, amyl, hexyl and the like.

The phrase "conventional groups convertible to hydroxy by hydrolysis" refers to conventional groups which can be hydrolyzed to hydroxy groups such as, for example, conventional hydrolyzable ester and hydrolyzable ether groups. The term "hydrolyzable ester groups" and "hydrolyzable acyl derivatives," as used herein, refer to those esters and acyl derivatives conventionally employed in the nucleoside and nucleotide art, preferably those derived from carboxylic acids of 1 to 12 carbon atoms. Typical conventional hydrolyzable acyl groups thus include acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, p-tolyloxy, $\beta$-cyclopentylpropionyl, and the like. The term "conventional hydrolyzable ether groups" as used herein denotes those hydrolyzable groups conventionally employed in the nucleoside and nucleotide art including tetrahydropyran-2'-yloxy, tetrahydrofuran-2'-yloxy, 4'-(lower)-alkyltetrahydropyran-4'-yloxy groups and the like.

The 5'-cyclic esters of 3'-deoxy-3'-dihydroxyphosphinyl-methyl-$\beta$-D-ribofuranosyl nucleosides and 2'-cyclic esters of 3'-deoxy-3'-dihydroxyphosphinylmethyl-$\beta$-D-ribofuranosyl nucleosides and salts thereof are anti-metabolic and antibacterial agents and are useful against a variety of organisms. The cyclic esters in the adenosine series exert control on enzymes involved in glycogenolysis. The phosphonic acids and cyclic esters thereof of this invention are resistant to the enzymes which normally hydrolyze phosphate mono- and diesters and are hence metabolically stable. The uridine derivatives, for example, are promoters of cell lysis. In addition, the 2' and 5'-cyclic esters and salts thereof of this invention can be used as intermediates for making phosphonate analogs of nucleoside co-enzymes. The cyclic esters and salts thereof of this invention are analogs of known nucleoside cyclic phosphates which are regulators of metabolic processes. These compounds are useful in regulating and controlling metabolism, and for producing metabolic deficiencies in biological systems.

The 5'-cyclic esters of 3'-deoxy-3'-dihydroxyphosphinyl-methyl-$\beta$-D-ribofuranosyl nucleosides of Formula A can be prepared from 3'-deoxy-3'-dihydroxyphinylmethyl-$\beta$-D-ribofuranosyl nucleoside intermediate of Formula E according to this invention by a procedure which can be illustrated as follows:

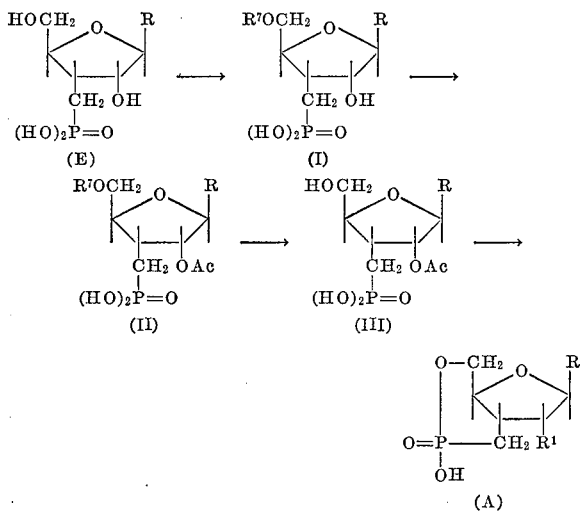

In the above procedure, R and $R^1$ are as defined above with respect to Formula A and $R^7$ is a trityl or a methoxy substituted trityl group.

In the above procedure, the 3'-deoxy-3'-dihydroxyphosphinylmethyl-$\beta$-D-ribofuranosyl nucleosides of Formula E are reacted with trityl halide or a methoxy substituted trityl halide (preferably a monomethoxy substituted trityl chloride) in a suitable anhydrous organic solvent such as pyridine for from one to 24 hours at about room temperature to yield the 3'-deoxy-3'-dihydroxyphosphinyl-methyl-5'-O-monomethoxytrityl-$\beta$-D-ribofuranosyl compounds of Formula I. Acylation of the compound of Formula I, for example, with acetic anhydride in a suitable inert organic solvent such as pyridine in the presence of tetraethylammoniumacetate yields the 2'-O-acetyl-3'-deoxy-3'-dihydroxyphosphinylmethyl-5'-O-monomethoxytrityl-$\beta$-D-ribofuranosyl compounds of Formula II. Selective hydrolysis of the trityl or methoxy substituted trityl group ($R^7$) of the compounds of Formula II, for example, with a mineral or organic acid such as acetic acid at room temperature from 0.1 to 10 hours, yields the corresponding 2'-O-acetyl-3'-deoxy-3'-dihydroxyphosphinyl-methyl-$\beta$-D-ribofuranosyl compounds of Formula III.

The 5'-cyclic esters of 3'-deoxy-3'-dihydroxyphosphinylmethyl-$\beta$-D-ribofuranosyl nucleosides are then prepared by cyclizing the compounds of Formula III. The compounds of Formula III in a pyridine solution are slowly added to a pyridine solution of dicyclohexylcarbodiimide, and the mixture is maintained under reflux for from 1 to 4 hours to yield the 5'-cyclic ester of the 2'-O-acetyl-3'-deoxy-3'-dihydroxyphosphinylmethyl-$\beta$-D-ribofuranosyl nucleosides of Formula A. Deacylation of this compound with aqueous ammonia yields the corresponding 5'-cyclic esters of 3'-deoxy-3'-dihydroxyphosphinyl-methyl-$\beta$-D-ribofuranosyl nucleosides of Formula A.

The corresponding acyl derivatives (compounds wherein R is a conventional hydrolyzable acyl derivative of a pyrimidine or purine base) and compounds wherein $R^1$ and/or $R^2$ is a conventional group convertible to hydroxy by hydrolysis are prepared by well known conventional procedures. The corresponding acyl or ester compounds can be prepared by reacting the cyclic nucleoside phosphonate with the desired corresponding organic acid anhydride of a carboxylic acid having from 1 to 12 carbons in a suitable inert organic solvent such as pyridine, for example, reacting it with acetic anhydride in pyridine. Tetrahydropyran-2-yl, tetrahydrofuran-2-yl, and 4-methoxytetrahydropyran-4-yl ethers can be prepared by well known, conventional procedures from the corresponding respective dihydropyran, dihydrofuran, and 4-methoxy-5,6-dihydro-2H-pyran in a suitable inert organic solvent such as dimethylformamide, dioxane or tetrahydrofuran in the presence of a suitable catalyst such as p-toluenesulfonic acid.

Salts with pharmaceutically acceptable cations (when $M^1$ and/or $M^2$ are pharmaceutically acceptable cations) can be prepared by cation exchange from another salt or by neutralization with a specific base followed by precipitation. Conventional methods are very adequate to make the salts. The 2'-cyclic esters of 3'-deoxy-3'-dihydroxyphosphinylmethyl-$\beta$-D-ribofuranosyl nucleosides are preferably converted to the salt ($M^2$ is other than hydrogen) immediately after being formed to stabilize it, that is, prevent it from hydrolyzing back to the compounds of Formula E.

The 2'-cyclic esters of 3'-deoxy-3'-dihydroxyphosphinyl-methyl-$\beta$-D-ribofuranosyl nucleosides of Formula B are prepared from the 3'-deoxy-3'-dihydroxyphosphinylmethyl-$\beta$-D-ribofuranosyl nucleoside intermediates of Formula E according to this invention by a procedure which can be illustrated as follows:

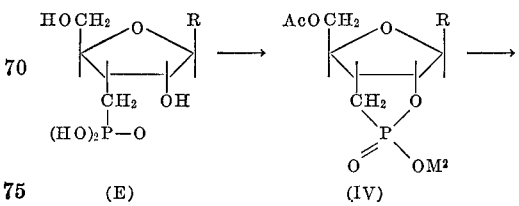

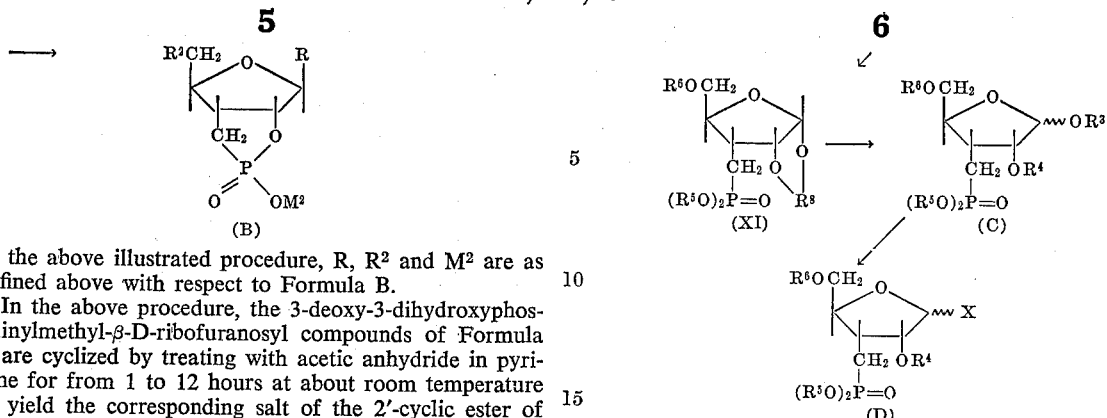

(B)

In the above illustrated procedure, R, R² and M² are as defined above with respect to Formula B.

In the above procedure, the 3-deoxy-3-dihydroxyphosphinylmethyl-β-D-ribofuranosyl compounds of Formula E are cyclized by treating with acetic anhydride in pyridine for from 1 to 12 hours at about room temperature to yield the corresponding salt of the 2'-cyclic ester of 5'-O-acetyl-3'-deoxy-3' - dihydroxyphosphinylmethyl-β-D-ribofuranosyl nucleosides of Formula IV. The 5'-ester of Formula IV is then subjected to conventional hydrolysis, for example with aqueous ammonia to yield the corresponding salt of the 2'-cyclic esters of 3'-deoxy-3'-dihydroxyphosphinylmethyl-β-D-ribofuranosyl nucleosides of Formula B. Preferably, the 3'-deoxy-3'-dihydroxyphosphinylmethyl-β-D-ribofuranosyl nucleoside is cyclized by treatment with dicyclohexylcarbodiimide in a suitable inert organic solvent such as t-butanol to directly yield the compounds of Formula B. Compounds of Formula B having corresponding conventional hydrolyzable acyl derivatives of the pyrimidine and purine bases, derivatives having said conventional groups convertible to hydroxy by hydrolysis (when R² is a conventional group convertible to hydroxy by hydrolysis), the free acid (M² is hydrogen) and salts with pharmaceutically acceptable cations (M² is one of such cations) can be prepared from the salts of Formula B by conventional cation exchange procedures with cation exchange resins loaded with the desired cation or by elution of the compounds from anion exchange resins or column chromatography on DEAE cellulose, eluting with a solution containing the cation desired as M².

The 3-phosphinylmethylfuranose intermediates of Formulas C and D can be prepared from the known α-D-ribo-hexafuranos-3-ulose diacetal of Formula V by a procedure according to this invention which can be illustrated as follows:

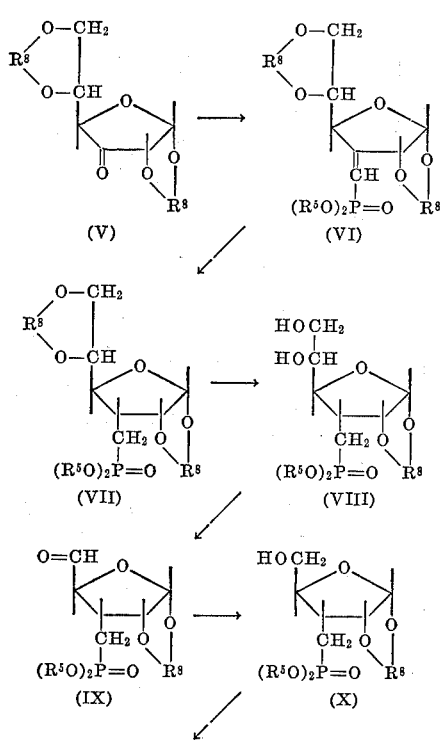

In the above illustrated procedure, R³, R⁴, R⁵ and R⁶ are defined above with respect to Formulas C and D. R⁸ is a bivalent cyclic or acyclic hydrocarbon radical having from 1 to 10 carbons such as a lower cycloalkylidene or alkylidene group, preferably isopropylidene or cyclohexylidene.

The first step in the above procedure is the conversion of the 1,2:5,6 - di-O-alkylidene-α-D-ribo-hexofuranos-3-ulose of Formula V to the corresponding vinyl phosphonate of Formula VI. The compounds of Formula V and the procedures for making them from the corresponding 1,2:5,6-di-O-alkylidene-α - D - glucofuranose compounds have been previously described in the literature, for example, by W. Sowa and G. H. S. Thomas, Can. J. Chem. 44, 836 (1966) and J. S. Brimacombe, J. G. H. Byran, H. Husain, M. Stacey, and M. S. Tolley, Carbohydrate Res. 3, 318 (1967). The first portion of this procedure comprises mixing a solution of a strong base such as sodium hydride or an alkyl lithium compound such as methyl lithium, ethyl lithium or butyl lithium, for example, in an inert organic solvent such as hexane with a solution of a tetra(lower)alkylmethylenebisphosphonate or tetraarylmethylenebisphosphonate in an aprotic solvent such as tetrahydrofuran, dimethyl formamide, dimethylacetamide, dimethylsulfoxide, N - methylpyrrolidinone, hexamethylphosphoramide, tetramethylurea, and the like at a temperature of −80 to 0° C., the mixture being maintained at this temperature for 0.25 to 1 hour. To this mixture is added a 1,2:5,6-di-O-alkylidene-α-D-ribo-hexofuranos-3-ulose of Formula V in an aprotic solvent such as tetrahydrofuran, the final mixture being maintained at a temperature of −20 to 10° C. for from 0.5 to 2 hours. The mixture is then permitted to reach room temperature and is left at room temperature for from 1 to 16 hours to yield the compounds of Formula VI, that is, 3 - dehydro-3-deoxy-3-dialkoxyphosphinylmethylene-1,2:5,6-di-O-alkylidene-α-D-ribo-hexofuranose or the corresponding 3-diaryloxyphosphinylmethylene compounds.

Hydrogenation of the compounds of Formula VI using, for example, a conventional catalyst such as palladium on an inert carrier such as carbon or barium sulfate in an inert organic solvent such as methanol at room temperature until the hydrogenation is complete (usually about one hour) yields 3-deoxy-3-dialkoxyphosphinylmethyl-1,2:5,6-di-O-alkylidene-α-D-allofuranose, or the corresponding respective 3-diaryloxyphosphinylmethyl compounds of Formula VII. The compounds of Formula VIII are then formed by selected hydrolysis of the 5,6-alkylidene group. The compounds of Formula VII can be treated with a dilute aqueous or organic mineral acid solution (such as hydrochloric or acetic acid) at room temperature for from 1 to 24 hours to yield the corresponding 3-deoxy-3-dialkoxyphosphinylmethyl-1,2-O - alkylidene-α-D-allofuranose or the respective 3-diaryloxyphosphinylmethyl compounds of Formula VIII.

The allofuranose compounds of Formula VIII are then converted to the corresponding ribo-pentodialdofuranose compounds of Formula IX by conventional glycol cleavage. The compounds of Formula VIII can be treated with sodium periodate in an aqueous alcohol solution such as an ethanol:water solution until the reaction is complete, usually for from about 5 minutes to one hour at a low temperature such as about 0° C. Alternatively, the compounds of Formula VIII can be treated with lead tetraacetate in an organic solvent such as benzene. Glycol cleavage of the compounds of Formula VIII yields the corresponding 3 - deoxy-3-dialkoxyphosphinylmethyl-1,2-O-alkylidene-α-D-ribo-pentodialdofuranose or the respective 3-diaryloxyphosphinylmethyl compounds of Formula IX.

The aldehyde group of the compounds of Formula IX is then reduced by conventional procedures to yield the corresponding hydroxy compounds of Formula X. The compounds of Formula IX can be reduced by treating them with lithium or sodium borohydride in an inert organic solvent such as an aqueous alcohol solution (such as 1:1 ethanol and water) for from 0.1 to 24 hours at about room temperature. The aldehyde reduction step yields the corresponding 3-deoxy-3-dialkoxyphosphinylmethyl-1,2-O-alkylidene-α-D-ribofuranose or the respective 3-diaryloxyphosphinylmethyl compounds of Formula X.

The compounds of Formula X are then esterified. To form the 5-O-benzoyl or substituted benzoyl groups, the compounds of Formula X are reacted with benzoyl chloride, an alkyl substituted benzoyl chloride, a nitro substituted benzoyl chloride, or a chloro substituted benzoyl chloride (any of the o-, m- or p-isomers) in a cooled pyridine solution for from 15 minutes to 2 hours at a temperature of about 0° C., following which the reaction mixture is maintained for from 4 to 24 hours at room temperature. The reaction of the compounds of Formula X with benzoyl chloride in this procedure yields the corresponding 5-O - benzoyl-3-deoxy-3-dialkoxyphosphinylmethyl-1,2,-O-alkylidene-α-D-ribofuranose or the respective 3-diaryloxyphosphinylmethyl compounds of Formula XI. Replacing benzoyl chloride with a substituted benzoyl chloride in the above procedure yields the corresponding alkyl-, nitro- or chloro-substituted benzoyl compounds of Formula XI. The compounds of Formula X can also be esterified with a lower aliphatic hydrocarbon acyl group such as acetyl, propionyl, butyryl, valeryl, and the like by reacting the free-hydroxy compound with the corresponding lower aliphatic hydrocarbon carboxylic acid anhydride in pyridine at about room temperature for from 4 to 24 hours. Esterification with the benzoyl or substituted benzoyl group is preferred.

The compounds of Formula C are prepared by treating the compounds of Formula XI with a mixture of the desired lower aliphatic hydrocarbon carboxylic acid anhydride and the corresponding carboxylic acid in the presence of a mineral acid such as sulfuric acid, hydrochloric acid and the like at room temperature for from 1 to 24 hours. The preferred reaction mixture comprises acetic acid anhydride, acetic acid and sulfuric acid. This procedure yields the corresponding 1,2-di-O-(aliphatic acyl)-5 - O - acyl - 3 - deoxy-3-dialkoxyphosphinylmethyl-β-D-ribofuranose, or respective 3 - diaryloxyphosphinylmethyl compounds of Formula C wherein the 5-O-acyl group is benzoyl, alkyl-, nitro- or chloro-substituted benzoyl, or an aliphatic acyl group.

The halides of Formula D are prepared by treating the esters of Formula C with a dry ether solution saturated with anhydrous hydrogen chloride (at about 0° C. for about 6 days) or hydrogen bromide (at about 20° C. for from 1 to 8 hours) to yield the corresponding 2-O-(aliphatic acyl) - 5 - O - acyl-3-deoxy-3-dialkoxyphosphinylmethyl - β - D - ribofuranosyl halide or the corresponding 3 - diaryloxyphosphinylmethyl compounds wherein the 5-O-aryl group is a benzoyl, alkyl-, nitro-, or chloro- substituted benzoyl or aliphatic acyl group.

Some 3'-nucleoside phosphonate intermediates of Formula E wherein R is R⁹ which is adenin-9-yl, 7-deazaadenin-9-yl, 6-chloropurin-9-yl or 2,6-dichloropurin-9-yl can be prepared from the 3-phosphinylmethylfuranose intermediates of Formula C according to this invention by a procedure which can be illustrated as follows:

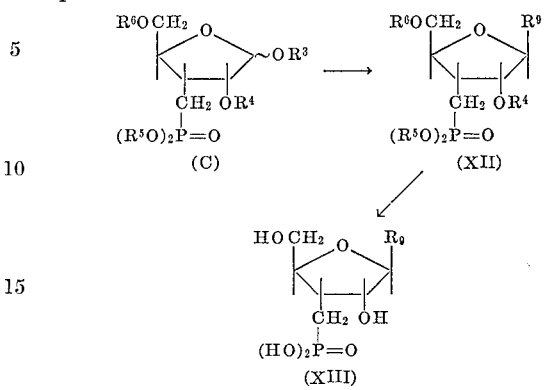

In the above procedure, R⁹ is as defined immediately above and R³, R⁴, R⁵ and R⁶ are as defined above with respect to Formula C.

In this procedure, the compounds of Formula C are mixed with the corresponding base, that is, 6-benzamidopurine, 6-benzamido-7-deazapurine, 6-chloropurine, or 2,6-dichloropurine in a melt with p-toluenesulfonic acid, dichloroacetic acid, sulfamic acid, or di-p-nitrophenyl phosphoric acid, for example, at about 160° C., the mixture being maintained at this temperature until a homogeneous melt is formed, that is, from about 10 minutes to one hour. The melt is then cooled to room temperature and purified by conventional techniques such as thin layer chromatography to yield the corresponding compounds of Formula XII, for example, 9-(2-O-acetyl-5-O-benzoyl-3-deoxy - 3 - dialkoxyphosphinylmethyl - β - D - ribofuranosyl)-6-benzamidopurine, 9 - (2 - O - acetyl-5-O-benzoyl - 3 - deoxy - 3-dialkyloxyphosphinylmethyl-β-D-ribofuranosyl)-6-benzamido - 7 - deazapurine, 9-(2 - O-acetyl - 5 - O - benzoyl-3-deoxy-3-dialkyloxyphosphinylmethyl - β - D - ribofuranosyl)-6-chloropurine, 9-(2-O-acetyl-5-O-benzoyl - 3 - deoxy - 3 - dialkyloxyphosphinylmethyl-β-D-ribofuranosyl) - 2,6 - dichloropurine and the like.

The comopunds of Formula XII, dissolved in a small amount of lower alkanol such as ethanol, are treated with concentrated aqueous ammonia for 30 minutes to 4 hours, that is, until the N-benzoyl group (if present) is completely removed. The solution is then evaporated to dryness, and the solid product mixture is treated for from 2 to 24 hours with an aqueous alkaline metal or alkaline earth metal hydroxide solution, preferably sodium hydroxide, to hydrolyze any remaining ester groups. Cation exchange of the product solution with a cation exchange resin in hydrogen form yields the corresponding 3'-deoxy - 3' - dihydroxyphosphinylmethyl - β-D - ribofuranosyl nucleosides of Formula XIII, that is, 9-(3-deoxy-3 - dihydroxyphosphinylmethyl-β-D-ribofuranosyl)-adenine, 9-(3 - deoxy - 3 - dihydroxyphosphinylmethyl-β-D-ribofuranosyl) - 7 - deazaadenine, 9 - (3 - deoxy-3-dihydroxyphosphinylmethyl - β - D - ribofuranosyl)-6-chloropurine, and 9 - (3 - deoxy-3-dihydroxyphosphinylmethyl - β - D - ribofuranosyl) - 2,6-dichloropurine.

Some 3'-deoxy - 3' - dihydroxyphosphinylmethyl-β-D-ribofuranosyl nucleosides of Formula E can be prepared from the 3 - phosphinylmethylfuranose intermediates of Formula D according to this invention by a procedure which can be illustrated as follows:

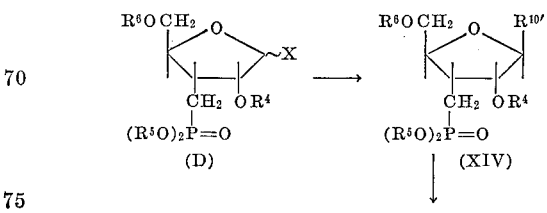

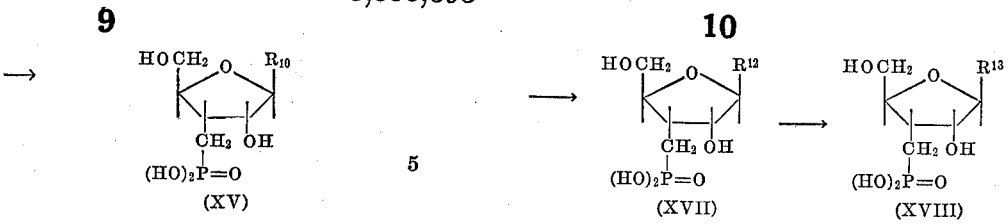

In the above procedure, $R^{10}$ is cytosin-1-yl, thymin-1-yl, 5-trifluoromethyluracil - 1 - yl, 5 - trifluoromethylcytosin-1-yl, hypoxanthin - 9 -yl, 7 - deazaguanin - 9 - yl, 6-dimethylaminopurin - 9 - yl, guanin-9-yl, 2,6-diaminopurin-9-yl, 2,6 - dimethylaminopurin - 9 - yl, 8-azaadenin-9-yl, and 8-azaguanin-9-yl;

$R^{10'}$ is a protected base group when protection is needed corresponding to $R^{10}$;

$R^4$, $R^5$, $R^6$ and X are as defined above with respect to Formula D.

In the above illustrated procedure, the chloro or bromo sugar of Formula D is reacted with known mercury derivitives of certain purine and pyrimidine bases prepared, for example, as described in J. Am. Chem. Soc. 73, 1650 (1951). These mercury derivatives (sometimes described as the mercury salt or mercury chloride salt of the bases) are usually prepared by reacting mercuric chloride and a suitably protected base in the presence of potassium or sodium hydroxide. An anhydrous solution of the purine or pyrimidine base mercury compounds (the base being suitably protected if necessary) and the halo sugar of Formula D is refluxed in an inert organic solvent such as xylene for from 15 minutes to 4 hours, and the reaction product is purified by conventional techniques such as thin layer chromatography to yield the corresponding compounds of Formula XIV. This method is suitable for preparing compounds of Formula XIV from the mercury salts of the corresponding bases wherein $R^{10'}$ is a mercury salt of N-acetylcytosin, thymine, 5-trifluoromethyluracil, N - acetyl - 5 - trifluoromethylcytosin, hypoxanthine, N - acetyl - 7 - deazaguanine, 6 - dimethylaminopurine, N - acetylguanine, 2,6-di(N-benzoylamino)purine, 2,6 - di(N - benzoylmethylamino)purine, N-benzoyl-8-azaadenine, or N-benzoyl-8-azaguanine group.

The 3'-deoxy-3'-dihydroxyphosphinylmethyl-β-D-ribofuranosyl nucleosides of Formula XV are then prepared by treating a lower alkanol (preferably ethanol) solution to the compounds of Formula XIV with concentrated aqueous ammonia until the N-protecting groups are removed, evaporating the resulting solution to dryness, and treating the resultant residue with an aqueous alkali metal or alkaline earth metal hydroxide solution, preferably a sodium hydroxide solution, at room temperature for 4 to 24 hours, and then treating the resultant solution with a cation exchange resin in the hydrogen form, eluting with aqueous ammonia to yield ammonium salts of the compounds of Formula XV, e.g. 1-(3-deoxy-3 - dihydroxyphosphinylmethyl - β - D - ribofuranosyl) - thymine, 1 - (3 - deoxy - 3 - dihydroxyphosphinylmethyl-β - D - ribofuranosyl) - trifluoromethyluracil, 1 - (3 - deoxy - 3 - dihydroxyphosphinylmethyl - β - D - ribofuranosyl)-6-dimethylaminopurine, and the like. Conventional ion exchange chromatographic methods can be used to remove the ammonium cation and to further purify the products obtained.

The remainder of the 3'-deoxy-3'-dihydroxyphosphinylmethyl-β-D-ribofuranosyl nucleosides of Formula E can be prepared from the 3-phosphinylmethylfuranose intermediates of Formula D according to this invention by a procedure which can be illustrated as follows:

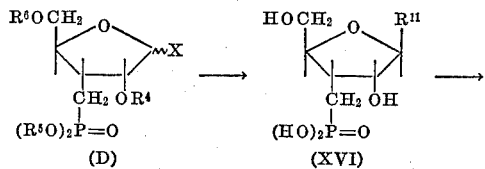

In the above procedure, $R^{11}$ is uracil-1-yl, cytosin-1-yl, 4-chloro-2(1H)-pyrimidon-1-yl, 5-fluorouracil-1-yl, 5-fluorocytosin-1-yl, thymin-1-yl, 5-methylcytosin-1-yl, 6-azauracil-1-yl, 6-azacytosin-1-yl, and 6-azathymin-1-yl;

$R^{12}$ is 5-bromouracil-1-yl, 5-bromocytosin-1-yl, 5-chlorouracil-1-yl, 5-chlorocytosin-1-yl, 5-iodouracil-1-yl, and 5-iodocytosin-1-yl;

$R^{13}$ is 5-aminouracil-1-yl, 5-aminocytosin-1-yl, 5-methylaminouracil-1-yl, 5-methylaminocytosin-1-yl, and 5-hydroxyuracil; and $R^4$, $R^5$, $R^6$ and X are as defined above with respect to Formula D.

In the above procedure, the sugar halide, preferably the sugar chloride, of Formula D is reacted with the desired base reactant in anhydrous acetonitrile under reflux conditions for from 4 to 36 hours. The reaction mixture is then evaporated to dryness, and the residue is purified by thin layer chromatography on a silicic acid base to yield the corresponding 3'-deoxy-3'-dihydroxyphosphinylmethyl-β-D-ribofuranosyl nucleoside "intermediate compounds." In this procedure, suitable base reactants include 5 - fluoro - 2,4 - dimethoxypyrimidine, 2,4 - dimethoxypyrimidine, 5 - methyl - 2,4 - dimethoxypyrimidine, 2,4 - dimethoxy - 6 - azapyrimidine, 2,4 - dimethoxy - 5 - methyl - 6 - azapyrimidine, and 4 - chloro - 2 - methoxypyrimidine. These base reactants yield the respective "intermediate compounds," i.e. 5-fluoro-4-methoxy-1(2-O-acetyl - 5 - O - benzoyl - 3 - deoxy - 3 - dialkoxyphosphinylmethyl - β - D - ribofuranosyl) - 2 - (1H) - pyrimidone, 4 - methoxy - 1(2 - O - acetyl - 5 - O - benzoyl - 3 - deoxy - 3 - dialkoxyphosphinylmethyl - β - D - ribofuranosyl) - 2 - (1H) - pyrimidone, 5 - methyl - 4 - methoxy - 1(2 - O - acetyl - 5 - O - benzoyl - 3 - deoxy - 3 - dialkoxyphosphinylmethyl - β - D - ribofuranosyl)-2 - (1H) - pyrimidone, 4 - methoxy - 1(2 - O - acetyl - 5 - O - benzoyl - 3 - deoxy - 3 - dialkoxyphosphinylmethyl - β - D - ribofuranosyl) - 2 - (1H) - 6 - azapyrimidone, 4 - methoxy - 5 - methyl - 1 - (2 - O - acetyl - 5 - O - benzoyl - 3 - deoxy - 3 - dialkoxyphosphinylmethyl-β - D - ribofuranosyl) - 6 - aza - 2(1H) - pyrimidone and 4 - chloro - 1 - (2 - O - acetyl - 5 - benzoyl - 3 - deoxy - 3 - dialkoxyphosphinylmethyl - β - D - ribofuranosyl) - 2(1H)-pyrimidone.

Treating 4 - chloro - 1 - (2 - O - acetyl - 5 - O - benzoyl-3 - deoxy - 3 - dialkoxyphosphinylmethyl - β - D - ribofuranosyl)-2(1H)-pyrimidone with aqueous ammonia, treating the product with an aqueous alkali metal or alkaline earth metal hydroxide solution followed by ion exchange resin an anion exchange resin ($HCO_3^-$ form), eluting with triethylammonium bicarbonate, evaporating to dryness, and precipitating the free acid from ethanol with an acid such as hydrochloric acid to yield the corresponding 4- chloro - 1 - (3 - deoxy - 3 - dihydroxyphosphinylmethyl - β - D - ribofuranosyl)-2(1H)-pyrimidone of Formula XVI.

To prepare some of the compounds of Formula XVI, the first four of the above "intermediate compounds" is treated with an ammonia saturated methanol solution at about 90° C. under pressure from 4 to 36 hours followed by evaporating the solvent; the residue is then treated with aqueous alkali metal hydroxide or alkaline earth metal hydroxide solution, and then treated with a cation exchange resin in hydrogen form, eluting with ammonia to yield the respective 1-(3-deoxy-3-dihydroxyphosphinylmethyl - β - D - ribofuranosyl) - 5 - fluorocytosine, 1 - (3 - deoxy - 3 - dihydroxyphosphinylmethyl - β - D - ribofuranosyl) - cytosine, 1 - (3 - deoxy - 3 - dihydroxyphosphinylmethyl - β - D - ribofuranosyl) - 5 - methylcytosine, and 1 - (3 - deoxy - 3 - dihydroxyphosphinylmethyl - β-D-ribofuranosyl)-6-azacytosine compounds of Formula XVI.

The above formed "intermediate compounds" can also be reacted with a solution of chloroform saturated with hydrochloric acid at room temperature for from 4 to 16 hours followed by the previously described steps of aqueous ammonia treatment, aqueous alkali metal or alkaline earth metal hydroxide treatment and ion exchange treatment with a cation exchange resin in hydrogen form, eluting with aqueous ammonia to yield the corresponding 1 - (3 - deoxy - 3 - dihydroxyphosphinylmethyl - β-D-D - ribofuranosyl) - 5 - fluorouracil, 1 - (3 - deoxy - 3 - dihydroxyphosphinylmethyl - β - D - ribofuranosyl) - uracil, 1 - (3 - deoxy - 3 - dihydroxyphosphinylmethyl - β - D - ribifuranosyl) - 5 - methyluracil, and 1 - (3-deoxy-3 - dihydroxyphosphinylmethyl - β - D - ribofuranosyl)-6 - azauracil, and 1 - (3 - deoxy - 3 - dihydroxyphosphinylmethyl - β - D - ribofuranosyl) - 6 - azathymine of Formula XVI.

The 5-halo (bromo, chloro and iodo) compounds of Formula XVII are prepared by reacting 1-(3-deoxy-3-dihydroxyphosphinylmethyl-β-D-ribofuranosyl)-uracil or 1-(3-deoxy-3-dihydroxyphosphinyl-methyl-β-D - ribofuranosyl)-cytosine of Formula XVI with bromine, chlorine or iodine in an inert organic solvent in the presence of nitric acid until the reaction is complete (at about room temperature for one hour with bromine) to yield the corresponding 5-bromo-1-(3-deoxy-3-dihydroxyphosphinylmethyl-β-D-ribofuranosyl)-uracil, 5-bromo-1-(3-deoxy-3-dihydroxyphosphinylmethyl-β-D-ribofuranosyl) - cytosine, and the respective 5-chloro or 5-iodo compounds of Formula XVII.

The 5-hydroxy compounds of Formula XVIII are prepared from the 5-bromo-1-(3-deoxy-3-dihydroxyphosphinylmethyl-β-D-ribofuranosyl)-uracil of Formula XVII. The 5-bromo compound is hydrolyzed with sodium bicarbonate at about 100° C. under an inert gas such as nitrogen for from about 4 to 24 hours to yield 1-(3-deoxy-3-dihydroxyphosphinylmethyl-β-D-ribofuranosyl) - 5 - hydroxyuracil. Alternatively, an aqueous solution of the disodium salt of 1-(3-deoxy-3-dihydroxyphosphinylmethyl-β-D-ribofuranosyl)-uracil can be brominated with saturated bromine water at room temperature to form the 5-bromo compound. The reaction mixture can then be mixed with pyridine and maintained at about 100° C. for 4 to 8 hours to form 1-(3-deoxy-3-dihydroxyphosphinylmethyl-β-D-ribofuranosyl)-5-hydroxyuracil.

The 5-amino and 5-methylamino compounds of Formula XVIII are prepared by reacting 5-bromo-1-(3-deoxy-3-dihydroxyphosphinylmethyl-β-D-ribofuranosyl) - uracil or 5-bromo-1-(3-deoxy-3-dihydroxyphosphinylmethyl-β-D-ribofuranosyl)-cytosine in anhydrous ammonia and methylamine, respectively, at from 60 to 100° C. for from 4 to 24 hours under pressure followed by treatment of the product residue with a cation exchange resin in hydrogen form to yield the 1-(3-deoxy-3-dihydroxyphosphinylmethyl-β-D-ribofuranosyl)-5-methylaminouracil, 1-(3-deoxy-3-dihydroxyphosphinylmethyl - β - D-ribofuranosyl)-5-methylaminocytosine, and the corresponding 5-amino compounds of Formula XVIII.

Particular advantage can be found in the use of trimethylsilyl derivatives of pyrimidine bases in which any amino substituents are first protected by acylation. Procedures using these reagents are described by Wittenburg in Chem. Ber. 101, 2132–2142 (1968).

The 3'-deoxy-3'-dihydroxyphosphinylmethyl-β-D-ribofuranosyl nucleosides of Formula E wherein R is $R^{14}$, that is, xanthin-9-yl and hypoxanthin-9-yl, can be prepared according to this invention by a procedure which can be illustrated as follows:

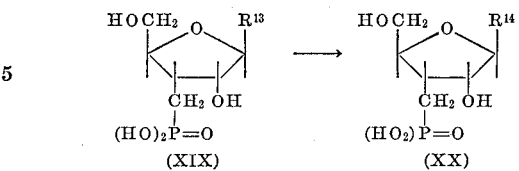

In the above procedure, $R^{13}$ is guanin-9-yl or adenin-9-yl and $R^{14}$ is as defined above.

In the above procedure, the compounds of Formula XIX are deaminated by treating them with an aqueous solution with sodium nitrite in the presence of sodium acetate at about 37° C. for from 1 to 8 hours followed by a treatment with an anion exchange resin in acetate form, eluting with ammonium acetate to yield 9-(3-deoxy-3-dihydroxyphosphinylmethyl-β-D-ribafuranosyl) - xanthine and 9-(3-deoxy-3-dihydroxyphosphinylmethyl-β-D-ribofuranosyl)-hypoxanthine.

The 3'-deoxy-3'-dihydroxyphosphinylmethyl-β-D-ribofuranosyl nucleosides of Formula E wherein R is $R^{16}$, that is, 6-methyl-mercaptopurin-9-yl and 6-mercaptopurin-9-yl, can be prepared according to this invention by a procedure which can be illustrated as follows:

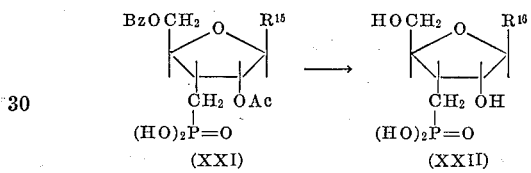

In the above procedure, $R^{15}$ is 6-chloropurin-9-yl.

In the above procedure to prepare the 6-mercaptopurin-9-yl compound, the 6-chloropurin-9-yl compound of Formula XXI is reacted with thiourea in absolute ethanol at reflux for about 1 hour and the reaction mixture is evaporated to dryness. This residue is treated overnight with concentrated ammonium hydroxide, evaporated to dryness, and the resultant residue is further treated for about 1 hour at room temperature with aqueous sodium hydroxide. This solution is neutralized with a free acid cation exchange resin and further purified by ion exchange chromatography to yield the 9-(3-deoxy-3-dihydroxyphosphinylmethyl-β-D-ribofuranosyl) - 6 - mercaptopurine of Formula XXII.

To prepare the compounds of Formula XXII having a 6-methyl-mercaptopurin-9-yl group, the reaction product of the reaction with thiourea is mixed with methyl iodide, and the mixture is maintained at room temperature for about four hours while dilute methanolic sodium hydroxide is added to maintain an alkaline pH. The reaction product is then evaporated to dryness and the residue treated with concentrated ammonium hydroxide, etc. as described above to yield the 9-(3-deoxy-3-dihydroxyphosphinylmethyl-β-D-ribofuranosyl)-6-methylmercaptopurine of Formula XXII.

This invention is further illustrated by the following specific but non-limiting examples.

EXAMPLE 1

3-dehydro-3-deoxy-3-diethoxyphosphinylmethylene-1,2:5,6-di-O-isopropylidene-α-D-ribofuranose A solution of tetraethylmethylenebisphosphonate (21.6 g., 75 mmoles) in 300 ml. dry tetrahydrofuran is placed in a 500 ml. three necked flask, equipped with reflux condenser, drying tube, rubber septum cap and gas inlet tube. To the magnetically stirred solution which is kept under inert gas and cooled with an acetone-dry ice bath is added 47 ml. (75 mmoles) of a 1.6 N solution of butyl lithium in hexane by means of a hypodermic syringe over a period of half an hour. After another 15 minutes, 17.6 g. (68 mmoles) of 1,2:5,6-di-O-isopropylidene-α-D-ribohexafuranos-3-ulose in 50 ml. tetrahydrofuran is added slowly. The solution is cooled for two hours, then allowed to warm to room temperature and kept overnight at room temperature.

Then 100 ml. of a saturated aqueous solution of ammonium chloride is added, followed by extraction with ethyl acetate (3×200 ml.). The combined organic solutions are washed with water (4×100 ml.), dried over magnesium sulfate and evaporated to yield 3-dehydro-3-deoxy-3-diethoxyphosphinylmethylene-1,2:5,6-di-O-isopropylidene-α-D-ribo-hexofuranose. Purification is carried out on a silica gel column (6.0×40 cm.) using a linear gradient of chloroform-ethyl acetate (4:1) and pure ethyl acetate (2000 ml. of each). 20 milliliter fractions are taken and examined by t.l.c. The appropriate fractions are pooled and evaporated to give the product which is further purified by distillation.

EXAMPLE 2

3-dehydro-3-deoxy-3-diphenoxyphosphinylmethylene-1,2:5,6-di-O-isopropylidene-α-D-ribo-hexofuranose Repeating the method of Example 1 with tetraphenylmethylenebisphosphonate yields the respective 3-dehydro-3-deoxy-3-diphenoxyphosphinylmethylene-1,2:5,6-di-O-isopropylidene-α-D-ribo-hexofuranose.

The tetraphenylmethylenebisphosphonate can be prepared by the following procedure: Methylenebis (phosphonyldichloride) (25.0 g.) and phenol (38 g.) are heated together under anhydrous conditions under reflux for 8 hours in an oil bath at 200–220° C. Final traces of hydrogen chloride gas are removed by heating under vacuum of about 50 mm. Hg yielding tetraphenylmethylenebisphosphonate which can be distilled under high vacuum if necessary to improve product purity.

EXAMPLE 3

3-deoxy-3-diethoxyphosphinylmethyl-1,2:5,6-di-O-isopropylidene-α-D-allofuranose 13.0 grams (33.2 mmoles) of the product of Example 1 is dissolved in 300 ml. of methanol and hydrogenated at room temperature in the presence of 10% palladium-on-charcoal catalyst (3.0 g.). Hydrogen uptake is essentially complete after one hour. The catalyst is filtered off and washed with methanol. The combined methanolic solutions are evaporated to give a residue which is put on a silica gel column (6.0×40 cm.). Elution is carried out as described for the purification in Example 1 to give 3-deoxy-3-diethoxyphosphinylmethyl-1,2:5,6-di-O-isopropylidene-α-D-allofuranose which is further purified by distillation.

EXAMPLE 4

3-deoxy-3-diphenoxyphosphinylmethyl-1,2:5,6-di-O-isopropylidene-α-D-allofuranose Repeating the procedure of Example 3 with the product of Example 2 yields the corresponding 3-deoxy-3-diphenoxyphosphinylmethyl-1,2:5,6-di-O-isopropylidene-α-D-allofuranose.

EXAMPLE 5

3-deoxy-3-diethoxyphosphinylmethyl-1,2-O-isopropylidene-α-D-allofuranose 400 milliliters of 0.02% aqueous hydrochloric acid is added to 7.9 g. (20 mmoles) of the product of Example 3 and the mixture shaken for 24 hours. After neutralization with sodium bicarbonate, the solution is evaporated to a smaller volume (150 ml.) and extracted with hexane (5×150 ml.). The aqueous layer is extracted with ethyl acetate (4×300 ml.) and the combined ethyl acetate extracts are dried over magnesium sulfate and evaporated to a syrup which crystallizes after addition of seed crystals (see crystals obtained by distillation of syrup sample and standing at room temperature for about one week) to yield 3-deoxy-3-diethoxyphosphinylmethyl-1,2-O-isopropylidene-α-D-allofuranose which is further purified by recrystallization from hexane-ethyl acetate (5:1).

EXAMPLE 6

3-deoxy-3-diphenoxyphosphinylmethyl-1,2-O-isopropylidene-α-D-allofuranose

Repeating the procedure of Example 5 with the product of Example 4 yields the corresponding 3-deoxy-3-diphenoxyphosphinylmethyl-1,2-O-isopropylidene-α-D-allofuranose.

EXAMPLE 7

3-deoxy-3-diethoxyphosphinylmethyl-1,2-O-isopropylidene-α-D-ribo-pentodialdofuranose To an ice-cooled, magnetically stirred solution of 3.85 g. (18 mmoles) of sodium metaperiodate in 120 ml. ethanol-water (1:1) is added 6.0 g. (17 mmoles) of the product of Example 5. Almost immediately precipitation of sodium iodate occurs. The mixture is stored for one hour at room temperature and two drips of ethylene glycol is then added to destroy excess periodate. By addition of aqueous sodium bicarbonate, the pH is brought to 6–7 and after filtration the solution is evaporated. The residue is taken up in ethanol, filtered from inorganic material and evaporated to give 3-deoxy-3-diethoxyphosphinylmethyl-1,2-O-isopropylidene-α-R-ribo-pentodialdofuranose.

EXAMPLE 8

3-deoxy-3-diphenoxyphosphinylmethyl-1,2-O-isopropylidene-α-D-ribo-pentodialdofuranose Repeating the procedure of Example 7 with the product of Example 6 yields the corresponding 3-deoxy-3-diphenoxyphosphinylmethyl-1,2-O-isopropylidene-α-D-ribo-pentodialdofuranose.

EXAMPLE 9

3-deoxy-3-diethoxyphosphinylmethyl-1,2-O-isopropylidene-α-D-ribofuranose

To a cool, well-stirred solution of 5.5 g. of the product of Example 7 in 150 ml. of aqueous ethanol (50%) is added 1.5 g. of sodium borohydride. After standing overnight at room temperature, the solution is neutralized with acetic acid and evaporated to dryness. The solid residue is partitioned between 100 ml. water and chloroform (200 ml.). The aqueous layer is extracted with chloroform (2×200 ml.) and the combined chloroform solutions dried over magnesium sulfate and evaporated to yield 3-deoxy-3-diethoxyphosphinylmethyl-1,2-O-isopropylidene-α-D-ribofuranose.

EXAMPLE 10

3-deoxy-3-diphenoxyphosphinylmethyl-1,2-O-isopropylidene-α-D-ribofuranose

Repeating the procedure of Example 9 with the product of Example 8 yields the corresponding 3-deoxy-3-diphenoxyphosphinylmethyl-1,2-O-isopropylidene-α-D-ribofuranose.

EXAMPLE 11

5-O-benzoyl-3-deoxy-3-diethoxyphosphinylmethyl-1,2-O-isopropylidene-α-D-ribofuranose To an ice-cooled solution of 4.5 g. (14 mmoles) of the product of Example 9 in 100 ml. pyridine is added benzoyl chloride (2.3 ml., 20 mmoles). The reaction mixture is kept one hour at 0° and then overnight at room temperature with exclusion of moisture. After addition of ice-water and aqueous sodium bicarbonate, the solution is extracted with chloroform (3×300 ml.), the combined chloroform extracts washed with water (100 ml.), dried over magnesium sulfate and evaporated under repeated addition of toluene to give 5-O-benzoyl-3-deoxy-3-diethoxyphosphinylmethyl-1,2-O-isopropylidene-α-D-ribofuranose.

EXAMPLE 12

5-O-benzoyl-3-deoxy-3-diphenoxyphosphinyl-
methyl-1,2-O-isopropylidene-α-D-ribofuranose.

Repeating the procedure of Example 11 with the product of Example 10 yields the corresponding 5-O-benzoyl-3 - deoxy - 3 - diphenoxyphosphinylmethyl - 1,2 - O - isopropylidene-α-D-ribofuranose

EXAMPLE 13

Repeating the procedure of Example 11 but replacing benzoyl choride with m-methylbenzoyl chloride, p-nitrobenzoyl chloride, and p-chlorobenzoyl chloride yields the corresponding 5 - O - (m-methybenzoyl)-3-deoxy-3-diethoxyphosphinylmethyl - 1,2 - O - isopropylidene - α - D-ribofuranose, 5 - O - (p - nitrobenzoyl) - 3 - deoxy-3-diethoxyphosphinylmethyl - 1,2 - O - isopropylidene-α-D-ribofuranose, and 5 - O - (p-chlorobenzoyl)-3-doxy-3-diethoxyphosphinylmethyl - 1,2 - O - isopropylidene - α - D-ribofuranose, respectively.

EXAMPLE 14

5-O-acetyl-3-deoxy-3-diethoxyphosphinylmethyl-
1,2-O-isopropylidene-α-D-ribofuranose 300 milligrams of the product of Example 9 is dissolved in pyridine, and 0.8 ml. of acetic anhydride is added to the solution. The mixture is allowed to stand at room temperature for 2 hours. The product mixture is then worked up by the procedure described in Example 11 to yield 5-O-acetyl-3-deoxy-3-diethoxyphosphinylmethyl-1,2-O-isopropylidene-α-D-ribofuranose.

EXAMPLE 15

1,2-di-acetyl-O-benzoyl-3-diethoxyphosphinyl-
methyl-β-D-ribofuranose

The product of Example 11 (4.5 g.) is dissolved in a cooled mixture of 40 ml. acetic acid and 15 ml. acetic anhydride. To the cooled, well-stirred solution is slowly added 1.5 ml. of concentrated sulfuric acid. The reaction mixture is stored overnight and poured into 100 ml. of icewater. Saturated aqueous sodium bicarbonate is added to neutralize most of the sulfuric acid (pH 3–4). The solution is stirred for two hours and then extracted with chloroform (3×300 ml.). The combined extracts are washed with aqueous sodium bicarbonate and water, dried over magnesium sulfate and evaporated. The residue is dissolved in ethyl acetate, partially evaporated, and allowed to crystallize give 1,2-di-acetyl-5-O-benzoyl-3-deoxy-3-diethoxyphosphinylmethyl-β-D-ribofuranose.

EXAMPLE 16

Repeating the procedure of Example 15 with the products of Examples 12 and 13 yields the corresponding 1,2-di-O-acetyl-5-O-benzoyl-3-deoxy - 3-diphenoxyphosphinylmethyl-β-D-ribofuranose, 1,2-di-O-acetyl-5-O-(m-methylbenzoyl) - 3 - deoxy - 3 - diethoxyphosphinylmethyl - β-D-ribofuranose, 1,2-di-O-acetyl-5-O-(p-nitrobenzoyl)-3-deoxy - 3 - diethoxyphosphinylmethyl - β-D-ribofuranose, and 1,2-di-O-acetyl-5-O-(p-chlorobenzoyl)-3-deoxy-3-diethoxyphosphinylmethyl-β-D-ribofuranose.

EXAMPLE 17

Repeating the procedure of Example 15 but replacing acetic anhydride with propionic acid anhydride, butyric acid anhydride and valeric acid anhydride and replacing acetic acid with the corresponding carboxylic acid yields the corresponding 1,2 - di - O - propionyl - 5-O-benzoyl-3-deoxy-3-diethoxyphosphinylmethyl-β-D-ribofuranose, 1,2-di - O - butyryl - 5 - O - benzoyl - 3 - deoxy - 3 - diethoxyphosphinylmethyl-β-D-ribofuranose, and 1,2-di-O-valeryl-5 - O - benzoyl - 3 - deoxy - 3 - diethoxyphosphinylmethyl-β-D-ribofuranose, respectively.

EXAMPLE 18

2-O-acetyl-5-O-benzoyl-3-deoxy-3-diethoxyphosphinyl-
methyl-β-D-ribofuranosyl chloride A solution of 300 mg. of the product of Example 15 in dry ether is saturated with anhydrous hydrogen chloride at 0° and kept in a refrigerator for three days. The solution is then evaporated under reduced pressure at 35° C. Codistillation of the concentrate with benzene yields 2-O-acetyl - 5 - O - benzoyl - 3 - deoxy - 3 - diethoxyphosphinylmethyl-β-D-ribofuranosyl chloride.

EXAMPLE 19

Repeating the procedure of Example 18 with the products of Examples 16 and 17 yields the corresponding 2-O-acetyl - 5 - O - benzoyl - 3 - deoxy - 3 - diphenoxyphosphinylmethyl-β-D-ribofuranosyl chloride, 2-O-acetyl-5-O - (m - methylbenzoyl) - 3 - deoxy - 3 - diethoxyphosphinylmethyl-β-D-ribofuranosyl chloride, 2-O-acetyl-5-O-(p - nitrobenzoyl) - 3 - deoxy - 3 - diethoxyphosphinylmethyl-β-D-ribofuranosyl chloride, 2-O-acetyl-5-O-(p-chlorobenzoyl) - 3 - deoxy - 3-diethoxyphosphinylmethyl-β-D-ribofuranosyl chloride, 2-O-propionyl-5-O-benzoyl-3 - deoxy - 3 - diethoxyphosphinylmethyl - β - D - ribofuranosyl chloride, 2-O-butyryl-5-O-benzoyl-3-deoxy-3-diethoxyphosphinylmethyl-β-D-ribofuranosyl chloride, and 2 - O - valeryl - 5 - O - benzoyl - 3 - deoxy - 3 - diethoxyphosphinylmethyl-β-D-ribofuranosyl chloride, respectively.

EXAMPLE 20

2-O-acetyl-5-O-benzoyl-3-deoxy-3-diethoxyphosphinyl-
methyl-β-D-ribofuranosyl bromide A solution of 300 mg. of the product of Example 15 in dry ether is saturated with anhydrous hydrogen bromide at 0° C. and maintained at this temperature for 4 to 24 hours. The solution is then evaporated under reduced pressure at 20° C. Codistillation of the concentrate with benzene yields 2-O-acetyl-5-O-benzoyl-3-deoxy-3-diethoxyphosphinylmethyl-β-D-ribofuranosyl bromide.

EXAMPLE 21

Repeating the procedure of Example 20 with the products of Examples 16 and 17 yields the corresponding 2-O - acetyl - 5 - O - benzoyl-3-deoxy-3-diphenoxyphosphinylmethyl-β-D-ribofuranosyl bromide, 2-O-acetyl-5-O-(m - methylbenzoyl) - 3 - deoxy-3-diethoxyphosphinylmethyl-β-D-ribofuranosyl bromide, 2-O-acetyl-5-O-(p-nitrobenzoyl)-3-deoxy-3-diethoxyphosphinylmethyl - β - D-ribofuranosyl bromide, 2-O-acetyl-5-O-(p-chlorobenzoyl)-3-deoxy-3-diethoxyphosphinylmethyl - β - D - ribofuranosyl bromide, 2-O-propionyl-5-O-benzoyl-3-deoxy-3-diethoxyphosphinylmethyl - β - D - ribofuranosyl bromide, 2 - O - butyryl-5-O-benzoyl-3-deoxy-3-diethoxyphosphinylmethyl-β-D-ribofuranosyl bromide, and 2-O-valeryl-5-O-benzoyl - 3 - deoxy-3-diethoxyphosphinylmethyl-β-D-ribofuranosyl bromide, espectively.

EXAMPLE 22

9-(2-O-acetyl-5-O-benzoyl-3-diethoxyphosphinylmethyl-
β-D-ribofuranosyl)-6-benzamidopurine A 25 ml. round bottom flask containing a mixture of 3.05 g. of the product of Example 15 and 1.22 g. of 6-benzamidopurine is heated in an oil-bath to 160°. To the mixture is added under stirring 120 mg. of di-p-nitrophenyl phosphoric acid, and the flask is evacuated (15 mm. Hg) and kept for 30 minutes between 160 and 170°. During this time, the melt becomes homogeneous. The reaction mixture is cooled to room temperature, partitioned between ethyl acetate and aqueous sodium bicarbonate, and the organic layer purified by preparative thin layer chromatography (acetone-chloroform 1:1). The nucleoside band is eluted with acetone, evaporated to dryness, and rechromatographed to yield 9-(2-O-acetyl-5-O-benzoyl - 3 - diethoxyphosphinylmethyl-β-D - ribofuranosyl)-6-benzamidopurine.

EXAMPLE 23

9-(2-O-acetyl-5-O-benzoyl-3-diethoxyphosphinylmethyl-β-D-ribofuranosyl)-purine base of Formula XII Repeating the procedure of Example 22 but replacing 6-benzamidopurine with 6-benzamido-7-deazapurine, 6-chloropurine and 2,6-dichloropurine yields the corresponding 9-(2-O-acetyl-5-O-benzoyl - 3 - diethoxyphosphinylmethyl-β-D-ribofuranosyl)-6-benzamido - 7 - deazapurine, 9-(2-O-acetyl - 5 - O - benzoyl-3-diethoxyphosphinylmethyl-β-D-ribofuranosyl)-6-chloropurine, and 9-(2-O-acetyl-5-O-benzoyl - 3 - diethoxyphosphinylmethyl-β-D-ribofuranosyl)-2,6-dichloropurine, respectively.

EXAMPLE 24

Repeating the procedure of Example 22 with the products of Examples 16 and 17 yields the corresponding 9-(2 - O - acetyl-5-O-benzoyl-3-diphenoxyphosphinylmethyl-β-D-ribofuranosyl)-6-benzamido-purine, 9-[2-O-acetyl-5 - O - (m - methylbenzoyl)-3-diethoxyphosphinylmethyl-β - D - ribofuranosyl]-6-benzamidopurine, 9-[2-O-acetyl-5 - O - (p - nitrobenzoyl)-3-diethoxyphosphinylmethyl-β-D - ribofuranosyl]-6-benzamidopurine, 9-[2-O-acetyl - 5-O - (p - chlorobenzoyl)-3-diethoxyphosphinylmethyl - β-D - ribofuranosyl]-6-benzamidopurine, 9-(2-O-propionyl-5 - O - benzoyl-3-diethoxyphosphinylmethyl-β-D-ribofuranosyl)-6-benzamidopurine, 9-(2-O-butyryl - 5 - O - benzoyl-3-diethoxyphosphinylmethyl - β - D - ribofuranosyl)-6-benzamidopurine, and 9-(2-O-valeryl-5-O-benzoyl - 3-diethoxyphosphinylmethyl-β-D-ribofuranosyl) - 6 - benzamidopurine.

EXAMPLE 25

Repeating the procedure of Example 23 with the products of Examples 16 and 17 yields the corresponding 9-(2 - O - acetyl-5-O-benzoyl-3-diphenoxyphosphinylmethyl- - β - D - ribofuranosyl)-(purine base), 9-[2-O-acetyl-5 - O - (m - methylbenzoyl)-3-diethoxyphosphinylmethyl-β-D-ribofuranosyl]-(purine base), 9-[2-O-acetyl-5-O-(p-nitrobenzoyl) - 3 - diethoxyphosphinylmethyl-β-D-ribofuranosyl]-(purine base), 9-[2-O-acetyl-5-O-(p - chlorobenzoyl) - 3-diethoxyphosphinylmethyl-β-D-ribofuranosyl]-purine base), 9-(2-O-propionyl - 5 - O - benzoyl-3-diethoxyphosphinylmethyl-β-D - ribofuranosyl) - (purine base), 9-(2-O-butyryl-5-O-benzoyl - 3 - diethoxyphosphinylmethyl - β - D - ribofuranosyl)-(purine base), and 9-(2-O-valeryl - 5 - O - benzoyl-3-diethoxyphosphinylmethyl-β-D-ribofuranosyl)-(purine base), wherein the purine base is 6-benzamido-7-deazapurine, 6-chloropurine, and 2,6-dichloropurine, respectively.

EXAMPLE 26

9-(3-deoxy-3-dihydroxyphosphinylmethyl-β-D-ribofuranosyl)-adenine 1.5 grams (2.3 moles) of the product of Example 22 is dissolved in a small amount of ethanol, and after addition of 20 ml. of concentrated aqueous ammonia, set aside for two hours. The solution is evaporated to dryness, and after addition of 20 ml. of 0.1 N sodium hydroxide, is left overnight at room temperature. The solution is passed over a sulfonic acid ion-exchange resin (H+ cycle) eluting with aqueous ammonia. After evaporating to dryness, the residue is dissolved in water and poured onto an anion-exchange resin (HCO₃⁻ form) column (3.5×40 cm.). The column is washed with 200 ml. of water and then eluted with a linear triethylammonium bicarbonate gradient. Fifteen ml. fractions are taken. The appropriate fractions are pooled and evaporated (ethanol added during evaporation) to dryness to yield the triethylammonium salt. This salt is converted into the free acid 9-(3-deoxy-3-dihydroxyphosphinylmethyl-β-D-ribofuranosyl) - adenine by dissolving it in ethanol and cautiously adding hydrochloric acid to precipitate the product.

Repeating the above procedure with the products of Example 24 yields, with each ester, 9-(3-deoxy-3-dihydroxyphosphinylmethyl-β-D-ribofuranosyl)-adenine.

EXAMPLE 27

9-(3-deoxy-3-dihydroxyphosphinylmethyl-β-D-ribofuranosyl)-(purine base)

Repeating the procedure of Example 26 with the products of Example 23 yields the corresponding 9-(3-deoxy-3-dihydroxyphosphinylmethyl - β - D - ribofuranosyl)-7-deazaadenine, 9-(3-deoxy-3-dihydroxyphosphinylmethyl-β-D-ribofuranosyl) - 6 - chloropurine, and 9-(3-deoxy-3-dihydroxyphosphinylmethyl-β-D-ribofuranosyl) - 2,6 - dichloropurine, respectively.

Repeating the above procedure with the products of Example 25 yields the same respective free-hydroxy compounds listed in the above paragraph.

EXAMPLE 28

1 - (2 - O - acetyl - 5 - O - benzoyl - 3 - deoxy-3-diethoxyphosphinylmethyl-β-D-ribofuranosyl)-N-acetylcytosine To an azeotropically dried suspension of N-acetylcytosine mercury in xylene is added two molar equivalents of the product of Example 18 in xylene. The mixture is refluxed for one hour. The mixture is then cooled to room temperature, filtered, and petroleum ether is added to the solution, giving a precipitate. The precipitate is dissolved in chloroform and extracted with aqueous potassium iodide and then with water. The chloroform solution is then purified by preparative thin layer chromatography. The nucleoside band is eluted with acetone, evaporated to dryness, and rechromatographed to yield 1-(2-O-acetyl-5 - O - benzoyl-3-deoxy-3-diethoxyphosphinylmethyl-β-D-ribofuranosyl)-N-acetylcytosine.

EXAMPLE 29

Repeating the procedure of Example 28 with the product of Example 19 yields the corresponding 1-(2-O-acetyl-5 - O - benzoyl - 3-deoxy-3-diphenoxyphosphinylmethyl-β-D - ribofuranosyl) - N-acetylcytosine, 1-[2-O-acetyl-5-O-(m - methylbenzoyl) - 3 - deoxy - 3 - diethoxyphosphinylmethyl - β - D - ribofuranosyl]-N-acetylcytosine, 1-[2-O-acetyl - 5 - O - (p-nitrobenzoyl)-3-deoxy-3-diethoxyphosphinylmethyl - β-D-ribofuranosyl]-N-acetylcytosine, 1-[2-O - acetyl - 5 - O - (p-chlorobenzoyl)-3-deoxy-3-diethoxyphosphinylmethyl - β - D-dibofuranosyl]-N-acetylcytosine, 1 - (2 - O-propionyl-5-O-benzoyl-3-deoxy-3-diethoxyphosphinylmethyl - β - D-ribofuranosyl)-N-acetylcytosine, 1-(2 - O - butyryl - 5 - O - benzoyl-3-deoxy-3-diethoxyphosphinylmethyl - β - D-ribofuranosyl)-N-acetylcytosine, and 1 - (2 - O - valeryl - 5-O-benzoyl-3-deoxy-3-diethoxyphosphinylmethyl - β - D-ribofuranosyl)-N-acetylcytosine, respectively.

EXAMPLE 30

1 - (2 - O - acetyl - 5 - O-benzoyl-3-deoxy-3-diethoxyphosphinylmethyl - β - D-ribofuranosyl)-(pyrimidine base) and 9-(2-O-acetyl-5-O-benzoyl-3-deoxy-3-diethoxyphosphinylmethyl-β-D-ribofuranosyl)-(purine base)

Repeating the procedure of Example 28 but replacing N-acetylcytosine mercury with the corresponding mercury salt of thymine, 5 - trifluoromethyluracil, N - acetyl-5-trifluoromethylcytosine, hypoxanthine, N-acetyl-7-deazaguanine, 6-dimethylaminopurine, N-acetylguanine, 2,6-di(N-benzoylamino)purine, 2,6 - di(N - benzoylmethylamino) purine, N-benzoyl-8-azaadenine, and N-benzoyl-8-azaguanine yields the corresponding 1-(2-O-acetyl-5-O-benzoyl-3 - deoxy - 3 - diethoxyphosphinylmethyl-β-D-ribofuranosyl)-thymine, 1-(2-O-acetyl-5-O-benzoyl-3-deoxy-3-diethoxyphosphinylmethyl - β - D - ribofuranosyl)-5-trifluoromethyluracil, 1 - (2 - O-acetyl-5-O-benzoyl-3-deoxy-3-diethoxyphosphinylmethyl - β - D-ribofuranosyl)-N-acetyl-5 - trifluoromethylcytosine, 9 - (2-O-acetyl-5-O-benzoyl-3-deoxy - 3 - diethoxyphosphinylmethyl-β-D-ribofuranosyl)- hypoxanthine, 9-(2-O-acetyl-5-O-benzoyl-3-deoxy-3-diethoxyphosphinylmethyl - β - D-ribofuranosyl)-N-acetyl-7-deazaguanine, 9 - (2 - O-acetyl-5-O-benzoyl-3-deoxy-3-diethoxyphosphinylmethyl - β-D-ribofuranosyl)-6-dimethylaminopurine, 9 - (2 - O-acetyl-5-O-benzyl-3-deoxy-3-diethoxyphosphinylmethyl - β - D-ribofuranosyl)-2,6-di(N-benzoylamino)purine, 9 - (2-O-acetyl-5-O-benzoyl-3-deoxy-3-diethoxyphosphinylmethyl - β - D - ribofuranosyl)-2,6-di-(N - benzoylmethylamino) - purine, 9-(2-O-acetyl-5-O-benzoyl - 3 - deoxy-3-diethoxyphosphinylmethyl-β-D-ribofuranosyl) - N - benzoyl-8-azaadenine, and 9-(2-O-acetyl-5 - O - benzoyl-3-deoxy-3-diethoxyphosphinylmethyl-β-D-ribofuranosyl)-N-benzoyl-8-azaguanine, respectively.

EXAMPLE 31

Repeating the procedure of Example 30 with the purine bases described therein but replacing 2-O-acetyl-5-O-benzoyl - 3 - deoxy - 3 - diethoxyphosphinylmethyl-β-D-ribofuranosyl chloride with the product of Example 19 yields the corresponding 9-(2-O-acetyl-5-O-benzoyl-3-diphenoxyphosphinylmethyl - β - D-ribofuranosyl)-(purine base), 9-[2 - O - acetyl - 5 - O-(m-methylbenzoyl)3-diethoxyphosphinyl - β-D-ribofuranosyl]-(purine base), 9-[2-O-acetyl-5 - O - (p-nitrobenzoyl)-3-diethoxyphosphinylmethyl-β-D-ribofuranosyl]-(purine base), 9-[2-O-acetyl-5-O-(p-chlorobenzoyl) - 3-diethoxyphosphinylmethyl-β-D-ribofuranosyl]-(purine base), 9-(2-O-propionyl-5-O-benzoyl-3-diethoxyphosphinylmethyl - β-D-ribofuranosyl)-(purine base), 9 - (2-O-butyryl-5-O-benzoyl-3-diethoxyphosphinylmethyl-β - D - ribofuranosyl)-(purine base), and 9-(2-O-valeryl-5 - O - benzoyl - 3 - diethoxyphosphinylmethyl-β-D-ribofuranosyl)-(purine base), wherein the purine base is hypoxanthine, N-acetyl-7-deazaguanine, 6-dimethylaminopurine, 2,6-di(N-benzoylamino)purine, 2,6-di(N-benzoylmethylamino)purine, N-benzoyl-8-azaadenine, and N-benzoyl-8-azaguanine, respectively.

Repeating the procedure of Example 30 with the pyrimidine bases described therein but replacing 2-O-acetyl-5 - O - benzoyl - 3-deoxy-3-diethoxyphosphinymethyl-β-D-ribofuranosyl chloride with the product of Example 19 yields the corresponding 1-(2-O-acetyl-5-O-benzoyl-3-diphenoxyphosphinylmethyl - β - D-ribofuranosyl)-(pyrimidine base), 1 - [2-O-acetyl-5-O-(m-methylbenzoyl)-3-diethoxyphosphinylmethyl - β - D-ribofuranosyl]-(pyrimidine base), 1 - [2-O-acetyl-5-O-(p-nitrobenzoyl)-3-diethoxyphosphinylmethyl - β - D-ribofuranosyl]-(pyrimidine base), 1 - [2-O-acetyl-5-O-(p-chlorobenzoyl)-3-diethoxyphosphinylmethyl - β-D-ribofuranosyl]-(pyrimidine base), 1 - (2 - O - propionyl-5-O-benzoyl-3-diethoxyphosphinylmethyl - β - D-ribofuranosyl)-(pyrimidine base), 1-(2-O-butyryl - 5 - O - benzoyl-3-diethoxyphosphinylmethyl-β-D-ribofuranosyl)-(pyrimidine base), and 1-(2-O-valeryl-5-O - benzoyl-3-diethoxyphosphinylmethyl-β-D-ribofuranosyl)-(pyrimidine base), wherein the pyrimidine base is thymine, 5-trifluoromethyluracil, and N-acetyl-5-trifluorocytosine, respectively.

EXAMPLE 32

9-(2-O-acetyl-5-O-benzoyl-3-deoxy-3-diethoxyphosphinylmethyl-β-D-ribofuranosyl)-N²-acetylguanine About 25 ml. of xylene was distilled from a suspension of 5.59 g. of chloromercuri-N²-acetylguanine in 175 ml. of xylene in order to remove last traces of water. The suspension was cooled to 25° C. and 12.3 mmoles of 2 - O - acetyl-5-O-benzoyl-3-deoxy-3-diethoxyphosphinylmethyl-β-D-ribofuranosyl bromide (prepared in Example 20) in 25 ml. of dry xylene was added. The mixture was stirred and heated. At about 50 to 100° C., the precipitate changed from a granular to flocculent form. After being refluxed for one hour, the hot mixture was filtered, and petroleum ether was added to the solution, giving a precipitate. The precipitate was dissolved in chloroform and extracted with aqueous potassium iodide and then with water. The chloroform solution was then purified by preparative thin layer chromatography. The nucleoside band is eluted with acetone, evaporated to dryness, and rechromatographed to yield 9-(2-O-acetyl-5-O-benzoyl-3-deoxy - 3 - diethoxyphosphinylmethyl-β-D-ribofuranosyl) N²-acetylguanine.

EXAMPLE 33

Repeating the procedure of Example 32 with the mercury salts of the products of Example 21 yields the corresponding 9 - (2 - O - acetyl - 5 - O - benzoyl - 3 - diphenoxyphosphinylmethyl - β - D - ribofuranosyl) - N² - acetylguanine, 9 - [2 - O - acetyl - 5 - O - (m - methylbenzoyl)-3 - diethoxyphosphinylmethyl - β - D - ribofuranoyl] - N-acetylguanine, 9 - [2 - O - acetyl - 5 - O - (p - nitrobenzoyl)-3 - diethoxyphosphinylmethyl - β - D - ribofuranosyl] - N²-N² - acetylguanine, 9 - [2 - O - acetyl - 5 - O - (p - chlorobenzoyl) - 3 - diethoxyphosphinylmethyl - β - D - ribofuranosyl] - N² - acetylguanine, 9 - (2 - O - propionyl - 5 - O - benzoyl - 3 - diethoxyphosphinylmethyl - β - D - ribofuranosyl) - N² - acetylguanine, 9 - (2 - O - butyryl - 5 - O - benzoyl - 3 - diethoxyphosphinylmethyl - β - D - ribofuranosyl) - N² - acetylguanine, and 9 - (2 - O - valeryl - 5 - O - benzoyl - 3 - diethoxyphosphinylmethyl - β - D - ribofuranosyl)-N²-acetylguanine, respectively.

EXAMPLE 34

1-(3-deoxy-3-dihydroxyphosphinylmethyl-β-D-ribofuranosyl)-cytosine 1.5 grams of the product of Example 28 is dissolved in a small amount of ethanol, and after the addition of 20 ml. of concentrated aqueous ammonia, set aside for 2 hours. The solution is evaporated to dryness, and after adding 20 ml. of 0.1 N sodium hydroxide, is left overnight at room temperature. The solution is passed over a cation exchange resin (H⁺ cycle), eluting with aqueous ammonia. After evaporating to dryness, the residue is dissolved in water and poured onto an anion exchange resin ($HCO_3^-$ form) column (3.5×40 cm.). The column is washed with 200 ml. of water and then eluted with a linear triethylammonium bicarbonate gradient. 15 milliliter fractions are taken. The appropriate fractions are collected and evaporated to dryness (ethanol being repeatedly added during evaporation) to yield the triethylammonium salt. This is converted into the free-acid 1-(3-deoxy - 3 - dihydroxyphosphinylmethyl -β - D - ribofuranosyl)-cytosine by dissolving the salt in ethanol and cautiously adding hydrochloric acid to precipitate the product.

Repeating this procedure with the products of Example 29 yields the above-named product.

EXAMPLE 35

9 - (3 - deoxy - 3 - dihydroxyphosphinylmethyl - β - D-ribofuranosyl) - (purine bases) and 1 - (3 - deoxy - 3-dihydroxyphosphinylmethyl - β - D - ribofuranosyl)-(pyrimidine bases) of Formula XV Repeating the procedure of Example 34 with the products of Examples 30 and 32 yields the corresponding 9-(3 - deoxy - 3 - dihydroxy - phosphinylmethyl - β - D - ribofuranosyl) - hypoxanthine, 9 - (3 - deoxy - 3 - dihydroxyphosphinylmethyl - β - D - ribofuranosyl) - 7 - deazaguanine, 9 - (3 - deoxy - 3 - dihydroxyphosphinylmethyl-β - D-ribofuranosyl)-6-dimethylaminopurine, 9-(3-deoxy-3 - dihydroxyphosphinylmethyl - β - D - ribofuranosyl)-2,6 - dimethylaminopurine, 9-(3-deoxy-3-dihydroxyphosphinylmethyl - β - D - ribofuranosyl) - 2,6 - dimethylaminopurine, 9 - (3 - deoxy - 3 - dihydroxyphosphinylmethyl - β - D - ribofuranosyl) - 8 - azaadenine, 9 - (3-deoxy - 3 - dihydroxyphosphinylmethyl - β - D - ribofuranosyl) - 8 - azaguanine, 1 - (3 - deoxy - 3 - dihydroxyphosphinylmethyl - β - D - ribofuranosyl) - thymine, 1 - (3-deoxy - 3 - dihydroxyphosphinylmethyl - β - D - ribofuranosyl) - 5 - trifluoromethyluracil, 1 - (3 - deoxy - 3-dihydroxyphosphinylmethyl - β - D - ribofuranosyl) - 5-trifluoromethylcytosine, and 9 - (3 - deoxy - 3 - dihydroxyphosphinylmethyl-β-D-ribofuranosyl)-guanine.

Repeating the above procedure with the products of Examples 31 and 33 yields the same above-named 3'-deoxy - 3' - dihydroxyphosphinylmethyl - β - D - ribofuranosyl nucleosides.

EXAMPLE 36

1-(3-deoxy-3-dihydroxyphosphinylmethyl-β-D-ribofuranosyl)-5-fluorocytosine

A mixture of 640 mg. (4 mmoles) of 5-fluoro-2,4-dimethoxypyrimidine and 4 mmoles of 2 - O - acetyl - 5 - O-benzoyl - 3 - deoxy 3 - diethoxyphosphinylmethyl - β - D-ribofuranosyl chloride in anhydrous acetonitrile (50 ml.) is heated under reflux for 15 hours. After evaporation to dryness, the residue is chromatographed on silicic acid giving, 5 - fluoro - 4 - methoxy - 1 - (2 - O - acetyl - 5 - O- benzoyl - 3 - deoxy - 3 - diethoxyphosphinylmethyl - β - D-ribofuranosyl)-2-(1H)-pyrimidone as a homogeneous syrup. This material is dissolved in methanol saturated with ammonia at 0° and heated under pressure at 90° for 16 hours. After evaporating the solvent, the residue is briefly treated with 0.1 N sodium hydroxide and then purified by ion exchange chromatography on DEAE-sephadex using a linear gradient of triethylammonium bicarbonate giving 1 - (3 - deoxy - 3 - dihydroxyphosphinylmethyl - β - D- ribofuranosyl)-5-fluorocytosine which is isolated as its sodium salt.

EXAMPLE 37

1 - (3 - deoxy - 3 - dihydroxyphosphinylmethyl - β - D- ribofuranosyl)cytosine, -5 - methylcytosine, and -6 - azacytosine Repeating the procedure of Example 36 but replacing 5 - fluoro - 2,4 - dimethoxypyrimidine with 2,4 - dimethoxypyrimidine with 2,4 - dimethoxypyrimidine, 5 - methyl - 2,4 - dimethoxypyrimidine and 2,4 - dimethoxy - 6-azapyrimidine yields the corresponding 1 - (3 - deoxy - 3-dihydroxyphosphinylmethyl - β - D - ribofuranosyl) - cytosine, 1 - (3 - deoxy - 3 - dihydroxyphosphinylmethyl - β- D - ribofuranosyl) - 5 - methylcytosine, and 1 - (3 - deoxy-3 - dihydroxyphosphinylmethyl - β - D - ribofuranosyl)-6-azacytosine.

EXAMPLE 38

1-(3-deoxy-3-dihydroxyphosphinylmethyl-β-D-ribofuranosyl)-5-fluorouracil

A mixture of 640 mg. of 5-fluoro-2,4-dimethoxypyrimidine and 4 mmoles of 2-O-acetyl-5-O-benzoyl-3-deoxy-3-diethoxyphosphinylmethyl - β - D - ribofuranosyl chloride in anhydrous acetonitrile (50 ml.) is heated under reflux for 15 hours. After evaporation to dryness, the residue is chromatographed on silicic acid giving, 5-fluoro-4-methoxy - 1 - (2 - O - acetyl - 5 - O - benzoyl - 3 - deoxy - 3-diethoxyphosphinylmethyl) - β - D - ribofuranosyl - 2- (1H) - pyrimidone as a homogenous syrup. This material is treated with chloroform saturated with hydrogen chloride at room temperature for 8 hours, and then treated with methanolic aqueous ammonia for 2 hours at room temperature. A solution is evaporated to dryness and after addition of 20 ml. of 0.1 N sodium hydroxide is left overnight at room temperature. The solution is passed over a cation exchange resin (H+ cycle), eluting with aqueous ammonia. After evaporating to dryness, the residue is dissolved in water and poured onto an anion exchange resin (HCO⁻₃ form) column (3.5×40 cm.). The column is washed with 200 ml. of water and then eluted with a linear triethylammonium bicarbonate gradient. 15 milliliter fractions are taken. The major UV absorbing fractions are pooled and evaporated to dryness (ethanol being added during evaporation) to yield the triethylammonium salt. This is converted to the free-acid 1-(3-deoxy-3-dihydroxyphosphinylmethyl - β - D - ribofuranosyl) - 5 - fluorouracil by dissolving the salt in ethanol and cautiously adding hydrochloric acid to precipitate the product.

EXAMPLE 39

1-(3-deoxy-3-dihydroxyphosphinyImethyl - β - D - ribofuranosyl)-uracil, -thymine, -6-azauracil, and -6-azathymine Repeating the procedure of Example 38 but replacing 5-fluoro-2,4-dimethoxypyrimidine with 2,4 - dimethoxypyrimidine, 5-methyl-2,4 - dimethoxypyrimidine and 2,4-dimethoxy-6-azapyrimidine and 2,4-dimethoxy-5-methyl-6-azapyrimidine yields the corresponding 1-(3-deoxy-3-dihydroxyphosphinylmethyl-β-D-ribofuranosyl) - uracil, 1-(3-deoxy-3-dihydroxyphosphinylmethyl - β - D - ribofuranosyl) - thymine, 1-(3-deoxy-3-dihydroxyphosphinylmethyl-β-D-ribofuranosyl)-6 - azauracil, 1,(3 - deoxy-3-dihydroxyphosphinylmethyl - β - D - ribofuranosyl)6-azathymine.

EXAMPLE 40

1-(3-deoxy-3-dihydroxyphosphinylmethyl - β - D - ribofuranosyl)-4-chloro-2-(1H)pyrimidone A mixture of 640 mg. of 4-chloro-2-methoxypyrimidine and 4 mmoles of 2-O-acetyl-5-O - benzoyl-3-deoxy-3-diethoxyphosphinylmethyl-β-D - ribofuranosyl chloride in anhydrous acetonitrile (50 ml.) is heated under reflux for 15 hours. After evaporating to dryness, the residue is chromatographed on silicic acid giving, 4-chloro-1-(2-O-acetyl-5-benzoyl-3-deoxy-3-diethoxy - phosphinylmethyl-β-D-ribofuranosyl)-2-(1H)-pyrimidone.

1.5 grams of this compound is dissolved in a small amount of ethanol, and after addition of 20 ml. of concentrated aqueous ammonia, is set aside for 2 hours. The solution is evaporated to dryness, and after addition of 20 ml. of 0.1 N sodium hydroxide, is left overnight at room temperature. The solution is passed over a cation exchange resin (H+ cycle), eluting with aqueous ammonia. After evaporating to dryness, the residue is dissolved in water and poured onto an anion exchange resin (HCO₃⁻ form) column (3.5×40 cm.). The column is washed with 200 ml. of water and then eluted with a linear triethylammonium bicarbonate gradient. 15 milliliter fractions are taken. The appropriate fractions are collected and evaporated to dryness (ethanol being added during evaporation) to yield the triethyl-ammonium salt. This is converted to the free-acid 1-(3-deoxy-3-dihydroxyphosphinylmethyl-β-D-ribofuranosyl) - 4 - chloro-2(1H)-pyrimidone by dissolving the salt in ethanol and cautiously adding hydrochloric acid to precipitate the product.

EXAMPLE 41

5-halo-1-(3-deoxy-3-dihydroxyphosphinylmethyl-β-D-ribofuranosyl)-uracil 1-(3-deoxy-3-dihydroxyphosphinylmethyl - β - D-ribofuranosyl)-uracil (322 mg., 1 mole) was dissolved in a mixture of dioxane (8 ml.) and 0.5 N nitric acid 2.0 ml.) and a solution of bromine (240 mg., 1.5 mmole) in carbon tetrachloride (2 ml.) was added. After one hour at room temperature the solution was evaporated in vacuo and the residue was dissolved and re-evaporated several times with ethanol. The final residue was dissolved in the minimum volume of ethanol and addition of ether effected precipitation of 5-bromo-1-(3-deoxy-3-dihydroxyphosphinylmethyl-β-D-ribofuranosyl)-uracil.

Repeating the above procedure replacing bromine with chlorine and carrying out the reaction at 20° C. for 15 minutes yields the corresponding 5-chloro-1-(3-deoxy-3-dihydroxyphosphinylmethyl-β-D-ribofuranosyl)-uracil.

Repeating the above procedure but replacing bromine with iodine and carrying out the reaction at 100° C. for 1 hour yields the corresponding 5-iodo-1-(3-deoxy-3-dihydroxyphosphinylmethyl-β-D-ribofuranosyl)-uracil.

EXAMPLE 42

5-halo-1-(3-deoxy-3-dihydroxyphosphinylmethyl-β-D-ribofuranosyl)-cytosine

Repeating the above procedure with 1-(3-deoxy-3-dihydroxyphosphinylmethyl-β-D-ribofuranosyl) - cytosine yields the corresponding respective 5-bromo-1-(3-deoxy-3-dihydroxyphosphinyl - methyl - β - D - ribofuranosyl) cytosine, 5-chloro-1-(3-deoxy - 3 - dihydroxyphosphinyl-methyl-β-D-ribofuranosyl) - cytosine, and 5-iodo-1-(3-deoxy-3-dihydroxyphosphinylmethyl - β-D-ribofuranosyl) cytosine.

EXAMPLE 43

1-(3-deoxy-3-dihydroxyphosphinylmethyl-β-D-ribofuranosyl)-5-hydroxyuracil

Saturated bromine water is added dropwise to an aqueous solution of the disodium salt of 1-(3-deoxy-3-dihydroxyphosphinylmethyl-β-D-ribofuranosyl) - uracil (1 mmole) in water (10 ml.) until a pale yellow color persists. This color is discharged by aeration, pyridine (5 ml. is added, and the solution is maintained at 100° for three hours. The solvent is then evaporated in vacuo, and an aqueous solution of the residue in water (10 ml.) is adjusted to pH 7.5 with barium hydroxide. A solution of 2 M barium acetate (1 ml.) is added, a small precipitate is removed by centrifugation, and addition of ethanol (20 ml.) leads to precipitation of the barium salt of 1-(3-deoxy-3-dihydroxyphosphinylmethyl - β - D-ribofuranosyl)-5-hydroxyuracil. After several washings with 60% ethanol the product is dried in vacuo.

As an alternate procedure, 5-bromo-1-(3-deoxy-3-dihydroxyphosphinylmethyl-β-D-ribofuranosyl) - uracil is hydrolyzed with aqueous sodium bicarbonate at 100° C. under nitrogen for 7 hours to yield 1-(3-deoxy-3-dihydroxyphosphinylmethyl-β-D-ribofuranosyl) - 5 - hydroxyuracil.

EXAMPLE 44

1-(3-deoxy-3-dihydroxyphosphinylmethyl-β-D-ribofuranosyl)-5-methylaminouracil and -5-aminouracil Free acid 5-bromo-1-(3-deoxy-3-dihydroxyphosphinylmethyl-β-D-ribofuranosyl)-uracil (0.4 g.) was dissolved in anhydrous methylamine and heated in a stainless steel bomb at 80° for 18 hours. After evaporation of the solvent the residue was purified by chromatography on a column of DEAE-Sephadex using a linear gradient (0 to 0.2 M) triethylammonium bicarbonate. Following evaporation in vacuo of the pooled fraction with $\lambda_{max}$ 300 mμ and removal of residual buffer by repeated evaporation with methanol the residue was passed through a column of Dowex 50 (H+) resin and the effluent containing the free acid was adjusted to pH 8.5 with barium hydroxide. Addition of two volumes of ethanol gave the barium salt of 1-(3-deoxy-3-dihydroxyphosphinylmethyl-β-D-ribofuranosyl)-5-methylaminouracil.

Repeating the above procedure replacing anhydrous methylamine with anhydrous ammonia yields the corresponding 1-(3-deoxy-3-dihydroxyphosphinylmethyl-β-D-ribofuranosyl)-5-aminouracil.

EXAMPLE 45

1-(3-deoxy-3-dihydroxyphosphinylmethyl-β-D-ribofuranosyl)-5-methylaminocytosine and 5-aminocytosine Repeating the procedures of Example 44 with 5-bromo-1-(3-deoxy - 3 - dihydroxyphosphinylmethyl-β-D-ribofuranosyl)-cytosine yields the corresponding 1-(3-deoxy-3-dihydroxyphosphinylmethyl - β - D - ribofuranosyl)-5-methylaminocytosine and 1-(3 - deoxy-3-dihydroxyphosphinylmethyl-β-D-ribofuranosyl)-5-aminocytosine.

EXAMPLE 46

9-(3-deoxy-3-dihydroxyphosphinylmethyl-β-D-ribofuranosyl)-xanthine

The diammonium salt of 9-(3-deoxy-3-dihydroxyphosphinylmethyl-β-D-ribofuranosyl)-guanine (0.5 g.) dissolved in 10 ml. of water was added to a solution of sodium nitrite (10 ml. of 2.5 M) and sodium acetate (10 ml. of 0.6 M, pH 4.2) and the resulting solution was kept at 37° for four hours. The pH was then raised to 7 with ammonium hydroxide and the mixture was applied to a column of Dowex-I (OCc̄) resin. Elution with water and then 0.05 M ammonium acetate (pH 3.8) removed some unreacted starting material and subsequent elution with 0.3 M ammonium acetate (pH 3.8) gave 9-(3-deoxy-3-dihydroxyphosphinylmethyl-β-D-ribofuranosyl)-xanthine. The pooled peak was evaporated to 20% of its volume, adjusted to pH 8 with barium hydroxide and to it was added 5 ml. of 2 M barium acetate followed by two volumes of ethanol. The resulting precipitated barium salt was washed several times with 60% ethanol and dried in vacuo.

EXAMPLE 47

9-(3-deoxy-3-dihydroxyphosphinylmethyl-β-D-ribofuranosyl)-hypoxanthine

Repeating the procedure of Example 46 with the diammonium salt of 9 - (3 - deoxy-3-dihydroxyphosphinylmethyl-β-D-ribofuranosyl)-adenine yields the corresponding 9 - (3 - deoxy-3-dihydroxyphosphinylmethyl-β-D-ribofuranosyl)-hypoxanthine.

EXAMPLE 48

9-(3-deoxy-3-dihydroxyphosphinylmethyl-β-D-ribofuranosyl)-6-mercaptopurine 600 milligrams of 9-(2-O-acetyl-5-O-benzoyl-3-deoxy-3-diethoxyphosphinylmethyl - β-D-ribofuranosyl)-6-chloropurine and 100 mg. of thiourea were dissolved in absolute ethanol (8 ml.) and heated under reflux for one hour. At this time thin layer chromatography showed the formation of a single slightly slower moving product with $\lambda_{max}$ 325 mμ. The mixture was evaporated to dryness and treated overnight with 10 ml. of concentrated ammonium hydroxide. After evaporation to dryness the residue was further treated for one hour at room temperature with 0.1 N sodium hydroxide. The final solution was neutralized with a free acid cation exchange resin and purified by ion exchange chromatography on a column of DEAE cellulose (HCO₃⁻) using a linear gradient of triethylammonium bicarbonate. The appropriate fractions ($\lambda_{max}$ 325 mμ) were pooled and evaporated leaving the triethylammonium salt of 9-(3-deoxy-3-dihydroxyphosphinylmethyl-β-D-ribofuranosyl)-6-mercaptopurine.

EXAMPLE 49

9-(3-deoxy-3-dihydroxyphosphinylmethyl-β-D-ribofuranosyl)-6-methylmercaptopurine 600 milligrams of 9-(2-O-acetyl-5-O-benzoyl-3-deoxy-3-diethoxyphosphinylmethyl - β - D - ribofuranosyl)-6-chloropurine and 100 mg. of thiourea were dissolved in absolute ethanol (8 ml.) and heated under reflux for one hour. Methyl iodide (1 ml.) was added and the mixture stirred at room temperature for 4 hours while dilute methanolic sodium hydroxide was added to maintain a slightly alkaline pH. The solvent was then evaporated and the residue treated overnight with 10 ml. of concentrated ammonium hydroxide. After evaporation of the solvent residue was treated for one hour at room temperature with 0.1 N sodium hydroxide and, after neutralization with an ion exchange resin, purified by chromatography on a column of DEAE cellulose using a linear gradient of triethylammonium bicarbonate. The appropriate fractions ($\lambda_{max}$ 294 mμ) were pooled and evaporated giving the triethylammonium salt of 9-(3-deoxy-3-dihydroxyphosphinylmethyl-β-D-ribofuranosyl) - 6 - methylmercaptopurine.

EXAMPLE 50

9-(2-O-acetyl-3-deoxy-3-dihydroxyphosphinylmethyl-β-D-ribofuranosyl)-adenine 200 milligrams of 9-(3-deoxy-3-dihydroxyphosphinylmethyl-β-D-ribofuranosyl)-adenine is evaporated three times with pyridine. The residue is suspended in 20 ml. of dry pyridine and 600 mg. of monomethoxytrityl chloride is added. The suspension is shaken in the absence of moisture for one hour. After six hours at room temperature, the solution is poured into ether. The solid formed is collected and washed with ether to give 9-(3-deoxy-3-dihydroxyphosphinylmethyl - 5-O-monomethoxytrityl-β-D-ribofuranosyl)-adenine.

300 milligrams of this compound is dissolved in pyridine and 0.6 g. of tetraethylammonium acetate added. Most of the pyridine is removed and then 0.8 ml. of acetic anhydride is added. The reaction mixture is allowed to stand at room temperature for two hours. Methanol is added and the solution evaporated to a small volume. 15 milliliters of pyridine/water (1:1) is added, the solution is held at room temperature for two hours and then passed over a cation-exchange resin (pyridinium form) column eluting with pyridine/water (1:1). The eluted material is evaporated and dissolved in small amount of pyridine, and precipitation with ether yields 9-(2-O-acetyl-3-deoxy-3-dihydroxyphosphinylmethyl-5-O - monomethoxytrityl-β-D-ribofuranosyl)-adenine.

9-(2-O-acetyl-3-deoxy-3 - dihydroxyphosphinylmethyl-β-D-ribofuranosyl)-adenine is prepared by hydrolysis of the monomethoxytrityl group from the 5-O-monomethoxytrityl compound with 80% aqueous acetic acid at room temperature.

EXAMPLE 51

Repeating the procedure of Example 50 with 9-(3-deoxy-3-dihydroxyphosphinylmethyl-β-D-ribofuranosyl)-7-deazaadenine,
9-(3-deoxy-3-dihydroxyphosphinylmethyl-β-D-ribofuranosyl)-6-chloropurine,
9-(3-deoxy-3-dihydroxyphosphinylmethyl-β-D-ribofuranosyl)-2,6-dichloropurine,
9-(3-deoxy-3-dihydroxyphosphinylmethyl-β-D-ribofuranosyl)-hypoxanthine,
9-(3-deoxy-3-dihydroxyphosphinylmethyl-β-D-ribofuranosyl)-7-deazaguanine,
9-(3-deoxy-3-dihydroxyphosphinylmethyl-β-D-ribofuranosyl)-6-dimethylaminopurine,
9-(3-deoxy-3-dihydroxyphosphinylmethyl-β-D-ribofuranosyl)-guanine,
9-(3-deoxy-3-dihydroxyphosphinylmethyl-β-D-ribofuranosyl)-2,6-diaminopurine,
9-(3-deoxy-3-dihydroxyphosphinylmethyl-β-D-ribofuranosyl)-2,6-dimethylaminopurine,
9-(3-deoxy-3-dihydroxyphosphinylmethyl-β-D-ribofuranosyl)-8-azaadenine,
9-(3-deoxy-3-dihydroxyphosphinylmethyl-β-D-ribofuranosyl)-8-azaguanine,
9-(3-deoxy-3-dihydroxyphosphinylmethyl-β-D-ribofuranosyl)-6-mercaptopurine,
9-(3-deoxy-3-dihydroxyphosphinylmethyl-β-D-ribofuranosyl)-6-methylmercaptopurine, and
9-(3-deoxy-3-dihydroxyphosphinylmethyl-β-D-ribofuranosyl)-xanthine yields the intermediate compounds 9-(3-deoxy-3-dihydroxyphosphinylmethyl-5-O-monomethoxytrityl-β-D-ribofuranosyl)-(purine base),
9-(2-O-acetyl-3-deoxy-3-dihydroxyphosphinylmethyl-5-O-monomethoxytrityl-β-D-ribofuranosyl)-(purine base), and
9-(2-O-acetyl-3-deoxy-3-dihydroxyphosphinylmethyl-β-D-ribofuranosyl)-(purine base)

wherein the purine base is, respectively, 7-deazaadenine, 6-chloropurine, 2,6-dichloropurine, hypoxanthine, 7-deazaguanine, 6-dimethylaminopurine, guanine, 2,6-diaminopurine, 2,6-dimethylaminopurine, 8-azaadenine, 8-azaguanine, 6-mercaptopurine, 6-methylmercaptopurine, and xanthine.

Repeating the procedure of Example 48 with 1-(3-deoxy-3-dihydroxyphosphinylmethyl-β-D-ribofuranosyl)-cytosine,
1-(3-deoxy-3-dihydroxyphosphinylmethyl-β-D-ribofuranosyl)-thymine,
1-(3-deoxy-3-dihydroxyphosphinylmethyl-β-D-ribofuranosyl)-5-trifluoromethyluracil,
1-(3-deoxy-3-dihydroxyphosphinylmethyl-β-D-ribofuranosyl)-5-trifluoromethylcytosine,
1-(3-deoxy-3-dihydroxyphosphinylmethyl-β-D-ribofuranosyl)-uracil,
1-(3-deoxy-3-dihydroxyphosphinylmethyl-β-D-ribofuranosyl)-4-chloro-2(1H)-pyrimidone,
1-(3-deoxy-3-dihydroxyphosphinylmethyl-β-D-ribofuranosyl)-5-fluorouracil,
1-(3-deoxy-3-dihydroxyphosphinylmethyl-β-D-ribofuranosyl)-5-fluorocytosine,
1-(3-deoxy-3-dihydroxyphosphinylmethyl-β-D-ribofuranosyl)-5-methylcytosine,
1-(3-deoxy-3-dihydroxyphosphinylmethyl-β-D-ribofuranosyl)-6-azauracil,
1-(3-deoxy-3-dihydroxyphosphinylmethyl-β-D-ribofuranosyl)-6-azacytosine,
1-(3-deoxy-3-dihydroxyphosphinylmethyl-β-D-ribofuranosyl)-6-azathymine,
1-(3-deoxy-3-dihydroxyphosphinylmethyl-β-D-ribofuranosyl)-5-bromouracil,
1-(3-deoxy-3-dihydroxyphosphinylmethyl-β-D-ribofuranosyl)-5-bromocytosine,
1-(3-deoxy-3-dihydroxyphosphinylmethyl-β-D-ribofuranosyl)-5-chlorouracil,
1-(3-deoxy-3-dihydroxyphosphinylmethyl-β-D-ribofuranosyl)-5-chlorocytosine,
1-(3-deoxy-3-dihydroxyphosphinylmethyl-β-D-ribofuranosyl)-5-iodouracil,
1-(3-deoxy-3-dihydroxyphosphinylmethyl-β-D-ribofuranosyl)-5-iodocytosine,
1-(3-deoxy-3-dihydroxyphosphinylmethyl-β-D-ribofuranosyl)-5-aminouracil,
1-(3-deoxy-3-dihydroxyphosphinylmethyl-β-D-ribofuranosyl)-5-aminocytosine,
1-(3-deoxy-3-dihydroxyphosphinylmethyl-β-D-ribofuranosyl)-5-methylaminouracil,
1-(3-deoxy-3-dihydroxyphosphinylmethyl-β-D-ribofuranosyl)-5-methylaminocytosine, and
1-(3-deoxy-3-dihydroxyphosphinylmethyl-β-D-ribofuranosyl)-5-hydroxyuracil yields the corresponding 1-(3-deoxy-3-dihydroxyphosphinylmethyl-5-O-monomethoxytrityl-β-D-ribofuranosyl)-(pyrimidine base),
1-(2-O-acetyl-3-deoxy3-dihydroxyphosphinylmethyl-5-O-monomethoxytrityl-β-D-ribofuranosyl)-(pyrimidine base),
and
1-(2-O-acetyl-3-deoxy-3-dihydroxyphosphinylmethyl-β-D-ribofuranosyl)-(pyrimidine base)

wherein the pyrimidine base is, respectively, cytosine, thymine, 5 - trifluoromethyluracil, 5 - trifluoromethylcytosine, uracil, 4-chloro-2(1H)-pyrimidone, 5-fluorouracil, 5-fluorocytosine, 5-methylcytosine, 6-azauracil, 6-azacytosine, 6-azathymine, 5-bromouracil, 5-bromocytosine, 5-chlorouracil, 5-chlorocytosine, 5-iodouracil, 5-iodocytosine, 5 - aminouracil, 5 - aminocytosine, 5 - methylaminouracil, 5-methylaminocytosine, and 5-hydroxyuracil, respectively.

EXAMPLE 52

5'-cyclic esters of 9-(3'-deoxy-3'-dihydroxyphosphinylmethyl-β-D-ribofuranosyl)-adenine A dilute solution of 1 mmole of 9-(2-O-acetyl-3-deoxy-3 - dihydroxyphosphinylmethyl - β - D - ribofuranosyl)-adenine in pyridine is added slowly to a solution of 5 mmoles of dicyclohexylcarbodiimide in pyridine. The reaction mixture is allowed to stand for 24 hours at room temperature. The reaction mixture is deacylated with aqueous ammonia and purified by column chromatography on DEAE cellulose ($HCO_3^-$). Acidification of the resulting salt-free triethylammonium salt gave the crystalline 5'-cyclic ester of 9-(3-deoxy-3'-dihydroxyphosphinylmethyl-β-D-ribofuranosyl)adenine of Formula A.

EXAMPLE 53

5'-cyclic esters of 9-(3'-deoxy-3'-dihydroxyphosphinyl methyl-β-D-ribofuranosyl)-purine bases of Formula A Repeating the procedure of Example 52 with the 9-(2 - O-acetyl-3-deoxy-3-dihydroxyphosphinylmethyl-β-D-ribofuranosyl)-purine bases prepared in Example 51 yields the corresponding 5'-cyclic esters of 9-(3'-deoxy-3'-dihydroxyphosphinylmethyl-β-D-ribofuranosyl)-7-deazaadenine,
9-(3'-deoxy-3'-dihydroxyphosphinylmethyl-β-D-ribofuranosyl)-adenine,
9-(3'-deoxy-3'-dihydroxyphosphinylmethyl-β-D-ribofuranosyl)-6-chloropurine,
9-(3'-deoxy-3'-dihydroxyphosphinylmethyl-β-D-ribofuranosyl)-2,6-dichloropurine,
9-(3'-deoxy-3'-dihydroxyphosphinylmethyl-β-D-ribofuranosyl)-hypoxanthine,
9-(3'-deoxy-3'-dihydroxyphosphinylmethyl-β-D-ribofuranosyl)-7-deazaguanine,
9-(3'-deoxy-3'-dihydroxyphosphinylmethyl-β-D-ribofuranosyl)-6-dimethylaminopurine,
9-(3'-deoxy-3'-dihydroxyphosphinylmethyl-β-D-ribofuranosyl)-guanine,
9-(3'-deoxy-3'-dihydroxyphosphinylmethyl-β-D-ribofuranosyl)-2,6-diaminopurine,
9-(3'-deoxy-3'-dihydroxyphosphinylmethyl-β-D-ribofuranosyl)-2,6-dimethylaminopurine.
9-(3'-deoxy-3'-dihydroxyphosphinylmethyl-β-D-ribofuranosyl)-8-azaadenine,
9-(3'-deoxy-3'-dihydroxyphosphinylmethyl-β-D-ribofuranosyl)-8-azaguanine,
9-(3'-deoxy-3'-dihydroxyphosphinylmethyl-β-D-ribofuranosyl)-6-mercaptopurine,
9-(3'-deoxy-3'-dihydroxyphosphinylmethyl-β-D-ribofuranosyl)-6-methylmercaptopurine, and
9-(3'-deoxy-3'-dihydroxyphosphinylmethyl-β-D-ribofuranosyl)-xanthine of Formula A, respectively.

EXAMPLE 54

5'-cyclic esters of 1-(3'-deoxy-3'-dihydroxyphosphinylmethyl-β-D-ribofuranosyl)-pyrimidine bases of Formula A Repeating the procedure of Example 52 with the 1-(2-O - acetyl-3-deoxy-3-dihydroxyphosphinylmethyl-β-D-ribofuranosyl)-pyrimidine bases obtained in Example 51 yields the corresponding 5'-cyclic esters of 1-(3'-deoxy-3'-dihydroxyphosphinylmethyl-β-D-ribofuranosyl)-cytosine,
1-(3'-deoxy-3'-dihydroxyphosphinylmethyl-β-D-ribofuranosyl)-thymine,
1-(3'-deoxy-3'-dihydroxyphosphinylmethyl-β-D-ribofuranosyl)-5-trifluoromethyluracil,
1-(3'-deoxy-3'-dihydroxyphosphinylmethyl-β-D-ribofuranosyl)-5-trifluorocytosine,
1-(3'-deoxy-3'-dihydroxyphosphinylmethyl-β-D-ribofuranosyl)-uracil,
1-(3'-deoxy-3'-dihydroxyphosphinylmethyl-β-D-ribofuranosyl)-4-chloro-2(1H)-pyrimidone,
1-(3'-deoxy-3'-dihydroxyphosphinylmethyl-β-D-ribofuranosyl)-5-fluorouracil,
1-(3'-deoxy-3'-dihydroxyphosphinylmethyl-β-D-ribofuranosyl)-5-fluorocytosine,
1-(3'-deoxy-3'-dihydroxyphosphinylmethyl-β-D-ribofuranosyl)-5-methylcytosine,
1-(3'-deoxy-3'-dihydroxyphosphinylmethyl-β-D-ribofuranosyl)-6-azauracil,
1-(3'-deoxy-3'-dihydroxyphosphinylmethyl-β-D-ribofuranosyl)-6-azacytosine,
1-(3'-deoxy-3'-dihydroxyphosphinylmethyl-β-D-ribofuranosyl)-6-azathymine,
1-(3'-deoxy-3'-dihydroxyphosphinylmethyl-β-D-ribofuranosyl)-5-bromouracil,
1-(3'-deoxy-3'-dihydroxyphosphinylmethyl-β-D-ribofuranosyl)-5-bromocytosine,
1-(3'-deoxy-3'-dihydroxyphosphinylmethyl-β-D-ribofuranosyl)-5-chlorouracil,
1-(3'-deoxy-3'-dihydroxyphosphinylmethyl-β-D-ribofuranosyl)-5-chlorocytosine,
1-(3'-deoxy-3'-dihydroxyphosphinylmethyl-β-D-ribofuranosyl)-5-iodouracil,
1-(3'-deoxy-3'-dihydroxyphosphinylmethyl-β-D-ribofuranosyl)-5-iodocytosine,
1-(3'-deoxy-3'-dihydroxyphosphinylmethyl-β-D-ribofuranosyl)-5-aminouracil,
1-(3'-deoxy-3'-dihydroxyphosphinylmethyl-β-D-ribofuranosyl)-5-aminocytosine,
1-(3'-deoxy-3'-dihydroxyphosphinylmethyl-β-D-ribofuranosyl)-5-methylaminouracil,
1-(3'-deoxy-3'-dihydroxyphosphinylmethyl-β-D-ribofuranosyl)-5-methylaminocytosine, and
1-(3'-deoxy-3'-dihydroxyphosphinylmethyl-β-D-ribofuranosyl)-5-hydroxyuracil, respectively.

EXAMPLE 55

2'-cyclic esters of 9-(3'-deoxy-3'-dihydroxyphosphinylmethyl-β-D-ribofuranosyl)-adenine A dilute solution of 1 mmole of 9-(3-deoxy-3-dihydroxyphosphinylmethyl - β - D-ribofuranosyl)-adenine in pyridine is mixed with 5 mmoles of acetic anhydride, and the mixture is maintained at room temperature for 1 hour to yield the corresponding 2'-cyclic esters of 9-(3'-deoxy-5' - O - acetyl-3'-dihydroxyphosphinylmethyl-β-D-ribofuranosyl) - adenine. The acetate was deacylated with aqueous ammonia and purified by column chromatography on DEAE cellulose ($HCO_3^-$). Elution with a linear gradient of triethylammonium bicarbonate followed by evaporation of the major UV absorbing peak and repeated coevaporation with methanol gave the triethylammonium salt of the 2'-cyclic ester of 9-(3'-deoxy-3'-dihydroxyphosphinylmethyl-β-D-ribofuranosyl)-adenine.

EXAMPLE 56

2'-cyclic esters of 9-(3'-deoxy-3'-dihydroxyphosphinylmethyl-β-D-ribofuranosyl)-adenine The triethylammonium salt of 9-(3-deoxy-3-dihydroxyphosphinylmethyl - β - D - ribofuranosyl)-adenine (1 mmole) was suspended in tertiary butanol (25 ml.) together with dicyclohexylcarbodiimide (3 mmoles). The mixture was stirred at 50–60° C. for several hours during which time the original salt dissolved. Water (20 ml.) was added, dicyclohexylurea was filtered off, and the filtrates were evaporated to about half their original volume. The resulting solution was extracted twice with ether, and the aqueous phase was purified by ion exchange chromatography as described in Example 55 to yield the triethylammonium salt of the 2'-cyclic ester of 9-(3'-deoxy-3'-dihydroxyphosphinylmethyl-β-D-ribofuranosyl)-adenine.

EXAMPLE 57

2'-cyclic esters of 9-(3'-deoxy-3'-dihydroxyphosphinylmethyl-β-D-ribofuranosyl)-purine bases of Formula B Repeating the procedure of Example 55 with the starting material 9-(3-deoxy-3-dihydroxyphosphinylmethyl-β-

D-ribofuranosyl)-(purine bases) listed in Example 53, yields the corresponding 2'-cyclic esters of 9-(3'-deoxy-3'-dihydroxyphosphinylmethyl-β-D-ribofuranosyl)-7-dezaadenine,
9-(3'-deoxy-3'-dihydroxyphosphinylmethyl-β-D-ribofuranosyl)-7-dezaadenine,
9-(3'-deoxy-3'-dihydroxyphosphinylmethyl-β-D-ribofuranosyl)-6-chloropurine,
9-(3'-deoxy-3'-dihydroxyphosphinylmethyl-β-D-ribofuranosyl)-2,6-dichloropurine,
9-(3'-deoxy-3'-dihydroxyphosphinylmethyl-β-D-ribofuranosyl)-hypoxanthine,
9-(3'-deoxy-3'-dihydroxyphosphinylmethyl-β-D-ribofuranosyl)-7-deazaguanine,
9-(3'-deoxy-3'-dihydroxyphosphinylmethyl-β-D-ribofuranosyl)-6-dimethylaminopurine,
9-(3'-deoxy-3'-dihydroxyphosphinylmethyl-β-D-ribofuranosyl)-quanine,
9-(3'-deoxy-3-'-dihydroxyphosphinylmethyl-β-D-ribofuranosyl)-2,6-diaminopurine,
9-(3'-deoxy-3'-dihydroxyphosphinylmethyl-β-D-ribofuranosyl)-2,6-dimethylaminopurine,
9-(3'-deoxy-3'-dihydroxyphosphinylmethyl-β-D-ribofuranosyl)-8-azaadenine,
9-(3'-deoxy-3'-dihydroxyphosphinylmethyl-β-D-ribofuranosyl)-8-azaguanine,
9-(3'-deoxy-3'-dihydroxyphosphinylmethyl-β-D-ribofuranosyl)-6-mercaptopurine,
9-(3'-deoxy-3'-dihydroxyphosphinylmethyl-β-D-ribofuransoyl)-6-methylmercaptopurine,
9-(3'-deoxy-3'-dihydroxyphosphinylmethyl-β-D-ribofuranosyl)-xanthine, respectively.

EXAMPLE 58

2'-cyclic esters of 1-(3'-deoxy-3'-dihydroxyphosphinylmethyl-β-D-ribofuranosyl)-pyrimidine bases Repeating the procedure of Example 56 with the 1-(3-deoxy - 3 - dihydroxyphosphinylmethyl - β - D - ribofuranosyl)-pyrimidine bases listed in Example 54 yields the corresponding 2'-cyclic esters of 1-(3'-deoxy-3'-dihydroxyphosphinylmethyl-β-D-ribofuranosyl)-cytosine,
1-(3'-deoxy-3'-dihydroxyphosphinylmethyl-β-D-ribofuranosyl)-thymine,
1-(3'-deoxy-3'-dihydroxyphosphinylmethyl-β-D-ribofuranosyl)-5-trifluoromethyluracil,
1-(3'-deoxy-3'-dihydroxyphosphinylmethyl-β-D-ribofuranosyl)-5-trifluoromethylcytosine,
1-(3'-deoxy-3-dihydroxyphosphinylmethyl-β-D-ribofuranosyl)-uracil,
1-(3'-deoxy-3'-dihydroxyphosphinylmethyl-β-D-ribofuranosyl)-4-chloro-2(1H)-pyrimidone,
1-(3'-deoxy-3'-dihydroxyphosphinylmethyl-β-D-ribofuranosyl)-5-fluorouracil,
1-(3'-deoxy-3'-dihydroxyphosphinylmethyl-β-D-ribofuranosyl)-5-fluorocytosine,
1-(3-'-deoxy-3'-dihydroxyphosphinylmethyl-β-D-ribofuranosyl)-5-methylcytosine,
1-(3'-deoxy-3'-dihydroxyphosphinylmethyl-β-D-ribofuranosyl)-6-azauracil,
1-(3'-deoxy-3'-dihydroxyphosphinylmethyl-β-D-ribofuranosyl)-6-azacytosine,
1-(3'-deoxy-3'-dihydroxyphosphinylmethyl-β-D-ribofuranosyl)-6-azathymine,
1-(3'-deoxy-3'-dihydroxyphosphinylmethyl-β-D-ribofuranosyl)-5-bromouracil,
1-(3'-deoxy-3'-dihydroxyphosphinylmethyl-β-D-ribofuranosyl)-5-bromocytosine,
1-(3'-deoxy-3'-dihydroxyphosphinylmethyl-β-D-ribofuranosyl)-5-chlorouracil,
1-(3'-deoxy-3'-dihydroxyphosphinylmethyl-β-D-ribofuranosyl)-5-chlorocytosine,
1-(3'-deoxy-3'-dihydroxyphosphinylmethyl-β-D-ribofuranosyl)-5-iodouracil,
1-(3'-deoxy-3'-dihydroxyphosphinylmethyl-β-D-ribofuranosyl)-5-iodocytosine,
1-(3'-deoxy-3'-dihydroxyphosphinylmethyl-β-D-ribofuranosyl)-5-aminouracil,
1-(3'-deoxy-3'-dihydroxyphosphinylmethyl-β-D-ribofuranosyl)-5-aminocytosine,
1-(3'-deoxy-3'-dihydroxyphosphinylmethyl-β-D-ribofuranosyl)-5-methylaminouracil,
1-(3'-deoxy-3'-dihydroxyphosphinylmethyl-β-D-ribofuranosyl)-5-methylaminocytosine, and
1-(3'-deoxy-3'-dihydroxyphosphinylmethyl-β-D-ribofuranosyl)-5-hydroxyuracil, respectively.

We claim:
1. A cyclic ester selected from the group consisting of compounds represented by Formulas A and B

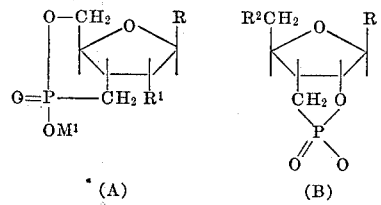

wherein R is a pyrimidine or purine base or a carboxylic acid acyl derivative thereof having from 1 to 12 carbons; $R^1$ and $R^2$ each is hydroxy, a carboxylic acid acyloxy group having from 1 to 12 carbons, tetrahydropyran-2'-yloxy, tetrahydrofuran-2'-yloxy, 4'-(lower)alkoxytetrahydropyran - 4'-yloxy, trityloxy or monomethoxytrityloxy; and each of $M^1$ and $M^2$ is hydrogen or a pharmaceutically acceptable cation.

2. A cyclic ester of claim 1 wherein R is uracil-1-yl, cytosin-1-yl, 4-chloro-2(1H)-pyrimidon-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorocytosin-1-yl, 5-trifluoromethyluracil-1-yl, 5-trifluoromethcytosin-1-yl, 5-trifluoromethyluracil-1-yl, 5-trifluorohethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthia-9-yl, 7-deazaadenin-9-yl-7-deazaguanin - 9-yl, adenin-9-yl, 6-dimethylaminopurin-1-yl, 6-chloropurin-9-yl, guanin-9-yl, xanthin-9-yl, 2,6-dichloropurin-9-yl, 2,6-dimethylaminopurin-9-yl, 2,6-diaminopurin-9-yl, 6-mercaptopurin-9-yl, 6-methylmercaptopurin-9-yl, 8-azaadenin-9-yl, thioguanin-9-yl or 8-azaguanin-9-yl.

3. A cyclic ester of claim 2 which is represented by Formula A.
4. A cyclic ester of claim 3 in which R is adenin-9-yl.
5. The cyclic ester of claim 3 wherein $R^1$ is hydroxy.
6. A cyclic ester of claim 2 which is represented by Formula B.
7. A cyclic ester of claim 6 in which R is cytosin-1-yl.
8. A cyclic ester of claim 6 in which R is uracil-1-yl.
9. A 3-phosphinylmethylfuranose selected from the group consisting of compounds which can be represented by Formulas C and D

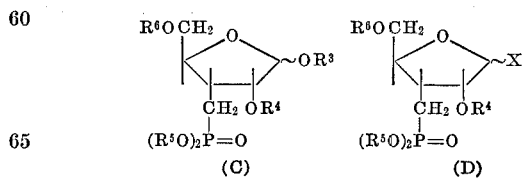

wherein $R^3$ and $R^4$ each is a lower aliphatic hydrocarbon acyl group, $R^6$ is a lower aliphatic hydrocarbon acyl group, a benzoyl group, or an alkyl-, nitro-, or chloro-substituted benzoyl group having up to 10 carbons; $R^5$ is lower alkyl or aryl having up to 10 carbons, and X is chloro or bromo.

10. A 3-phosphinylmethylfuranose of claim 9 which is represented by Formula C.

11. A 3-phosphinylmethylfuranose of claim 9 which is represented by Formula D.

12. A 3' - deoxy - 3'-dihydroxyphosphinylmethyl-β-D-ribofuranosyl nucleoside which can be represented by Formula E:

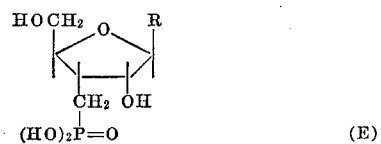

(E)

wherein R is a pyrimidine or purine base or a carboxylic acid acyl derivative thereof having from 1 to 12 carbons.

13. A 3' - deoxy - 3' - dihydroxyphosphinylmethyl-β-D-ribofuranosyl nucleosides of claim 12 wherein R is uracil-1-yl, cytosin-1-yl, 4-chloro-2(1H)-pyrimidon-1-yl, 5-bromouracil-1-yl, 5-bromocytosin-1-yl, 5-chlorouracil-1yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, 7-deazaadenine-9-yl, 7-deazaguanin-9-yl, adenin-9-yl, 6-dimethylaminopurin-1-yl, 6-chloropurin-9-yl, guanin-9-yl, xanthin-9-yl, 2,6-dichloropurin-9-yl, 2,6-dimethylaminopurin-9-yl, 2,6-diaminopurin-9-yl, 6-mercaptopurin-9-yl, 6-methylmercaptopurin-9-yl, 8-azaadenin-9-yl, thioguanin-9-yl or 8-azaguanin-9-yl.

References Cited
UNITED STATES PATENTS

| 3,238,191 | 3/1966 | Myers | 260—211.5 |
| 3,300,479 | 1/1967 | Hanze | 260—211.5 |
| 3,463,772 | 8/1969 | Nagyvary | 260—211.5 |

LEWIS GOTTS, Primary Examiner

J. R. BROWN, Assistant Examiner

U.S. Cl. X.R.
260—211.5, 999